(12) United States Patent
Benedek et al.

(10) Patent No.: US 8,812,971 B2
(45) Date of Patent: Aug. 19, 2014

(54) SYSTEM FOR PROVIDING STRATEGIES TO REDUCE THE CARBON OUTPUT AND OPERATING COSTS OF A WORKPLACE

(75) Inventors: Zsolt Benedek, Petaluma, CA (US); Jonathan Wen Jay Liang, Saratoga, CA (US); Jacob O. Wenegrat, Menlo Park, CA (US)

(73) Assignee: Accenture Global Services Limited, Dublin (IE)

( * ) Notice: Subject to any disclaimer, the term of this patent is extended or adjusted under 35 U.S.C. 154(b) by 977 days.

(21) Appl. No.: 12/144,910

(22) Filed: Jun. 24, 2008

(65) Prior Publication Data
US 2009/0204916 A1 Aug. 13, 2009

Related U.S. Application Data

(63) Continuation-in-part of application No. 12/030,040, filed on Feb. 12, 2008.

(51) Int. Cl.
*G06F 3/048* (2013.01)
*G06Q 10/00* (2012.01)
*G06F 3/0484* (2013.01)
*G06Q 10/06* (2012.01)

(52) U.S. Cl.
CPC .............. *G06F 3/0484* (2013.01); *G06Q 10/06* (2013.01)
USPC .......... 715/771; 705/7.37; 715/781; 715/210; 715/215

(58) Field of Classification Search
CPC ...................... G06Q 10/0637; G06Q 10/06375
USPC ........... 715/775, 764, 771; 705/7.13, 12, 7.37
See application file for complete search history.

(56) References Cited

U.S. PATENT DOCUMENTS 5,483,656 A 1/1996 Oprescu et al.
5,555,195 A 9/1996 Jensen et al.
(Continued)

FOREIGN PATENT DOCUMENTS

GB 2408592 A 1/2005
JP 2003-259468 9/2003
(Continued)

OTHER PUBLICATIONS

Extended European Search Report issued for European Patent Application No. 10003602.9, dated Jul. 26, 2010. 11 pages.
(Continued)

*Primary Examiner* — Steven B Theriault
*Assistant Examiner* — Amy M Levy
(74) *Attorney, Agent, or Firm* — Brinks Gilson & Lione

(57) ABSTRACT

A system is described for providing strategies to reduce the carbon output and operating cost of a workplace. The system may include a memory, interface, and processor. The memory may store an initial configuration of a workplace and workplace initiatives. The initial workplace configuration may include equipment and travel data items, and each workplace initiative may be associated with a data item and may provide a strategy for reducing the carbon output of the associated data item. The processor may receive the initial configuration from the user and provide workplace initiatives to the user. The processor may receive a selection of an initiative from the user. The processor may process the initial workplace configuration and selected initiative to determine a recommended configuration capable of reducing the carbon output of the data item associated with the selected initiative. The processor may provide the recommended configuration to the user.

21 Claims, 22 Drawing Sheets

(56) References Cited

U.S. PATENT DOCUMENTS

| | | | |
|---|---|---|---|
| 5,619,631 A * | 4/1997 | Schott | 345/440 |
| 5,852,560 A | 12/1998 | Takeyama et al. | |
| 5,960,214 A | 9/1999 | Sharpe et al. | |
| 6,490,569 B1 | 12/2002 | Grune et al. | |
| 7,333,903 B2 | 2/2008 | Walters et al. | |
| 7,386,743 B2 | 6/2008 | Bahali et al. | |
| 2002/0004913 A1 | 1/2002 | Fung | |
| 2003/0212589 A1 * | 11/2003 | Kish | 705/9 |
| 2004/0044476 A1 * | 3/2004 | Miyamoto et al. | 702/2 |
| 2004/0049424 A1 | 3/2004 | Murray et al. | |
| 2004/0186927 A1 * | 9/2004 | Eryurek et al. | 710/12 |
| 2005/0102544 A1 | 5/2005 | Brewer et al. | |
| 2005/0144437 A1 * | 6/2005 | Ransom et al. | 713/151 |
| 2005/0231758 A1 | 10/2005 | Reynolds | |
| 2006/0015424 A1 * | 1/2006 | Esposito et al. | 705/35 |
| 2006/0053023 A1 | 3/2006 | Matsunaga et al. | |
| 2006/0123807 A1 | 6/2006 | Sullivan et al. | |
| 2006/0161450 A1 | 7/2006 | Carey et al. | |
| 2006/0184445 A1 * | 8/2006 | Sandor et al. | 705/37 |
| 2007/0005994 A1 | 1/2007 | Bahali | |
| 2007/0010914 A1 | 1/2007 | Johnson et al. | |
| 2007/0027593 A1 * | 2/2007 | Shah et al. | 701/30 |
| 2007/0038388 A1 | 2/2007 | Nojima | |
| 2007/0038501 A1 | 2/2007 | Lee et al. | |
| 2007/0043540 A1 | 2/2007 | Cleland et al. | |
| 2007/0118551 A1 * | 5/2007 | Akkiraju et al. | 707/102 |
| 2007/0174024 A1 * | 7/2007 | Rasmussen et al. | 703/1 |
| 2007/0239317 A1 * | 10/2007 | Bogolea et al. | 700/276 |
| 2007/0245163 A1 | 10/2007 | Lu et al. | |
| 2007/0255457 A1 * | 11/2007 | Whitcomb et al. | 700/273 |
| 2007/0260896 A1 | 11/2007 | Brundridge | |
| 2007/0300084 A1 | 12/2007 | Goodrum et al. | |
| 2008/0028058 A1 | 1/2008 | Shaw et al. | |
| 2008/0201595 A1 | 8/2008 | Kawasaki | |
| 2008/0228865 A1 | 9/2008 | Cruzada | |
| 2008/0313276 A1 | 12/2008 | Abrams et al. | |
| 2009/0099887 A1 * | 4/2009 | Sklar et al. | 705/7 |
| 2009/0204916 A1 | 8/2009 | Benedek et al. | |
| 2009/0307024 A1 * | 12/2009 | Edholm et al. | 705/7 |
| 2009/0307508 A1 * | 12/2009 | Curtis et al. | 713/320 |
| 2010/0292877 A1 | 11/2010 | Lee | |

FOREIGN PATENT DOCUMENTS

| | | |
|---|---|---|
| JP | 2004185310 | 7/2004 |
| JP | 2005 182558 A | 7/2005 |
| WO | WO 02/090914 A1 | 11/2002 |

OTHER PUBLICATIONS

Frost & Sullivan. *Intelligent Middleware*. A Frost & Sullivan White Paper 2008. 18 pages.

EPO Extended International Search Report of the International Searching Authority (the European Patent Office) regarding Application No. EP09002154, dated Dec. 2, 2009, 7 pages.

Herrlin M.K., Khankari K., "Method for Optimizing Equipment Cooling Effectiveness and HVAC Cooling Costs in Telecom and Data Centers", Ashrae Transactions, Jan. 23, 2008, XP002556875 New York, 9 pages.

Herrlin, Magnus K. Ed—Anonymous: "A New Tool for Evaluating and Designing the Thermal Environment in Telecom Central Offices", Annual International Telecommunications Energy Conference, 28th, IEEE, PI, Sep. 1, 2006, XP031020275 ISBN: 978-1-4244-0430-8, 5 pages.

http://www.carbonfootprint.com/calculator.aspx, "Carbon Footprint—Calculate, Reduce and Offset—Carbon Footprint Calculator," 12 pages, published at least as of Feb. 11, 2008.

http://www.businessgreen.com/business-green/news/2209241/accenture-launch-calculator, "Accenture Working on Calculator to Track Servers' Embedded Carbon," pp. 1-4, published at least as of Feb. 8, 2008.

http://www.safeclimate.net/calculator, "Climate Change News and Actions by Safeclimate Calculator," 4 pages, published at least as of Feb. 11, 2008.

http://www.bp.com/extendedsectiondenericarticle.do?categoryId=9015627&contentId=7044493 , "Carbon Footprint Calculator Climate change BP," 9 pages, published at least as of Feb. 11, 2008.

http://www.epa.gov/climatechange/emissions/ind_calculator.html, "Individual Emissions Personal Emissions Calculator Climate Change Greenhouse Gas," pp. 1-6, published at least as of Feb. 11, 2008.

http://www.nature.org/initiatives/climatechange/calculator, "Carbon Footprint Calculator Calculate Your Impact on Climate Change," 6 pages, published at least as of Feb. 11, 2008.

"Virtualization," *Wikipedia, the free encyclopedia*, pp. 1-6, http://en.wikipedia.org/wiki/Virtualization, published at least as of Jan. 18, 2008.

http://www.powermeterstore.com/p3865/shark_100s.php, "Shark 100S power meter, wireless," published at least as of May 19, 2008.

Yiyu Chen et al., Managing Server Energy and Operational Costs in Hosting Centers, pp. 303-314, SIGMETRICS, Jun. 6-7, 2005.

Notification of Third Office Action from corresponding Chinese Application No. 200910005795.4 dated Jul. 4, 2013 with English translation.

Office Action issed in commonly owned U.S. Appl. No. 12/416,744, mailed Jan. 9, 2013.

EPA, "Emission Facts", Apr. 2000, EPA420-F-00-013, pp. 1-3.

Notification of First Office Action from corresponding Chinese Application No. 200910005795.4; 4 pp., dated Feb. 5, 2012 (with translation 5 pp.).

Notice of Reason for Refusal mailed Jan. 14, 2014 issued in Japanese Application No. 2010-080647 (2 pages) with English translation (2 pages).

Notification of First Office Action issued in Chinese Application No. 201010195967.1 dated Oct. 10, 2013 (8 pages) and English Translation (14 pages).

\* cited by examiner

| Model | Max Watts | Typical Watts | Idle Watts |
|---|---|---|---|
| CRT Monitor Generic | 73 | 73 | 3 |
| Desktop Generic | 115 | 115 | 84 |
| Laptop Generic | 75 | 75 | 40 |
| LCD Monitor Generic | 41 | 41 | 3 |

—1810

| Model | Max Watts | Typical Watts | Idle Watts |
|---|---|---|---|
| EnergyStar Desktop | 109 | 60 | 53 |
| EnergyStar Monitor | 28 | 28 | 3 |
| EnergyStar Laptop | 75 | 52 | 40 |

—1820

| Model | Max Watts | Typical Watts | Idle Watts | Maint Cost. | Misc. Cost | Typical Hours | Idle Hours |
|---|---|---|---|---|---|---|---|
| EnergyStar Desktop | 109 | 60 | 53 | 1000 | 375 | 40 | 16 |
| EnergyStar Monitor | 28 | 28 | 3 | 0 | 0 | 40 | 16 |
| EnergyStar Laptop | 75 | 52 | 40 | 1000 | 375 | 40 | 16 |

| Model | Max Watts | Typical Watts | Idle Watts |
|---|---|---|---|
| Generis OS isolation | 31 | 31 | 1 |
| Generic Process isolation | 25 | 25 | 1 |
| Generic Hardware isolation | 23 | 23 | 1 |

1910

| Thin Client isolation | Power Consumption |
|---|---|
| Thin Client Generic only | 7.5 |
| OS isolation additional load | 24 |
| Process isolation Additional load | 18 |
| Hardware isolation | 16 |

1920

| Model | Max Watts | Typical Watts | Idle Watts | Maint Cost. | Misc. Cost | Typical Hours | Idle Hours |
|---|---|---|---|---|---|---|---|
| Generic Process isolation | 25 | 25 | 53 | 25 | 20 | 50 | 10 |

| Model | Max Watts | Typical Watts | Idle Watts |
|---|---|---|---|
| TelePresence Generic | 7333 | 7333 | 850 |

2010

| Description | Wattage Draw |
|---|---|
| TelePresence equip. during call | 3204 |
| Idle Mode | -798 |
| HVAC Load | 4002 |
| Network Equipment | 128 |
| Total Watts for Typical and Max | 7333 |

2020

| Model | Max Watts | Typical Watts | Idle Watts | Maint Cost. | Misc. Cost | Typical Hours | Idle Hours |
|---|---|---|---|---|---|---|---|
| TelePresence Generic | 7333 | 7333 | 850 | 0 | 0 | 40 | 16 |

2030

| Operating Cost | Annual Cost |
|---|---|
| Administration Costs | 65000 |
| Data Cost | 20000 |
| Maintenance Cost | 60000 |
| Depreciation and Interest Cos | 70000 |
| Miscellaneous Cost | 10000 |
| Total Operating Cost | 150000 |

2040

| Travel Expense | Reduction |
|---|---|
| Average Miles per Flight | 30% |
| Average Cost per Flight | 30% |
| Average Number of Flights | 40% |

SYSTEM FOR PROVIDING STRATEGIES TO REDUCE THE CARBON OUTPUT AND OPERATING COSTS OF A WORKPLACE

CROSS-REFERENCE TO RELATED APPLICATIONS

This application is a continuation-in-part of U.S. patent application Ser. No. 12/030,040, filed on Feb. 12, 2008, which is incorporated by reference herein.

TECHNICAL FIELD

The present description relates generally to a system and method, generally referred to as a system, for providing strategies to reduce the carbon output and operating costs of a workplace, and more particularly, but not exclusively, to providing strategies for reducing the carbon output and operating costs associated with the operation of a workplace.

BACKGROUND

The costs and carbon impact of energy use are becoming increasingly important to consumers, organizations and governments. Organizations may be reassessing their energy use in response to impending regulation, high costs, and public perception. The energy required to operate the technology used in an organization's workplace may account for a significant portion of the organization's overall energy use. Organizations may be able to reduce their energy costs and carbon impact by migrating to energy efficient workplace technology implementations

SUMMARY

A system for providing strategies to reduce the carbon output and operating costs of a workplace may include a memory, an interface, and a processor. The memory may be connected to the processor and the interface and may store an initial workplace configuration and one or more workplace initiatives. The initial workplace configuration may include one or more data items, at least one of the data items being an equipment data item or a travel data item. Each of the workplace initiatives may be associated with one of the data items and may provide a strategy for reducing a carbon output of the associated data item. The interface may be operatively connected to the memory and may be operative to communicate with a user. The processor may be operatively connected to the memory and the interface and may be operative to receive the initial workplace configuration from the user via the interface. The processor may provide one or more workplace initiatives to the user via the interface and receive a selection of a workplace initiative from the user via the interface. The processor may process the initial workplace configuration and the selected workplace initiative to determine a recommended workplace configuration. The recommended workplace configuration may be capable of reducing the carbon output of the data item associated with the selected initiative. The processor may provide the recommended workplace configuration to the user via the interface.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 14 is a screenshot of a user interface for providing detailed technology configuration data in the system of FIG.

1, or other systems for providing strategies to reduce the carbon output and operating costs of a workplace.

Figure 1:
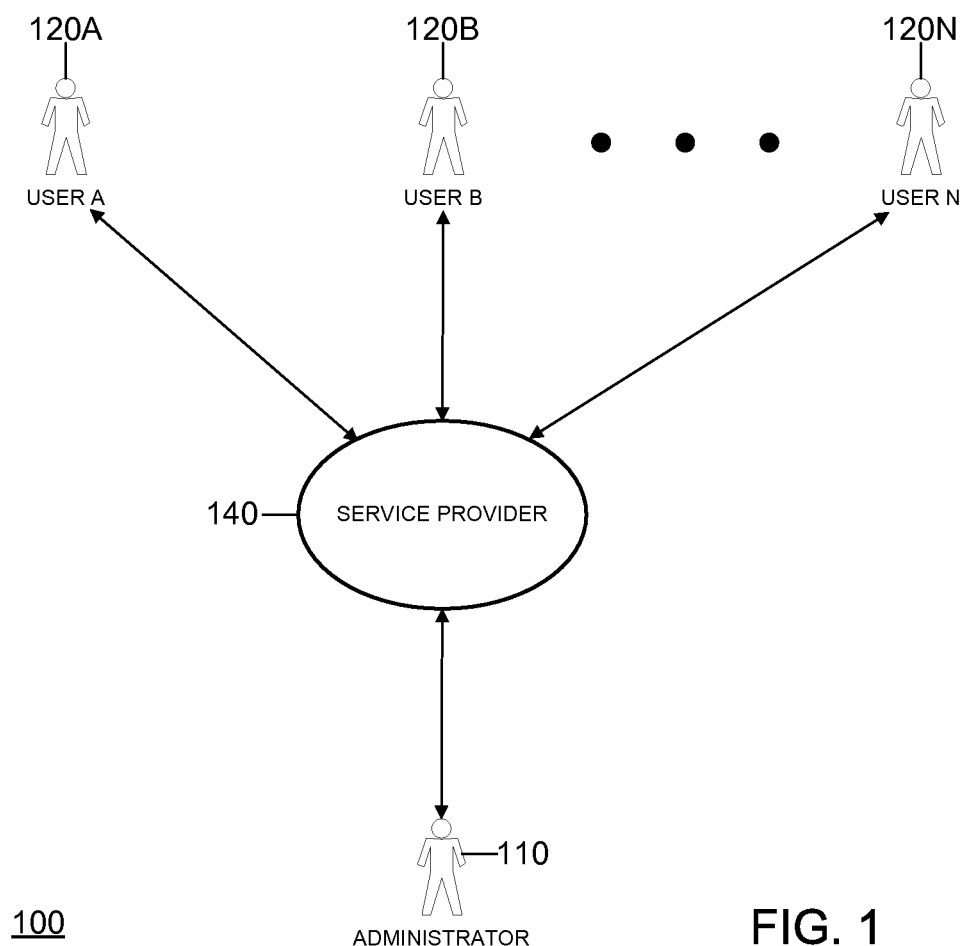
FIG. 1 is a block diagram of a general overview of a system for providing strategies to reduce the carbon output and operating costs of a workplace.
Figure 15:
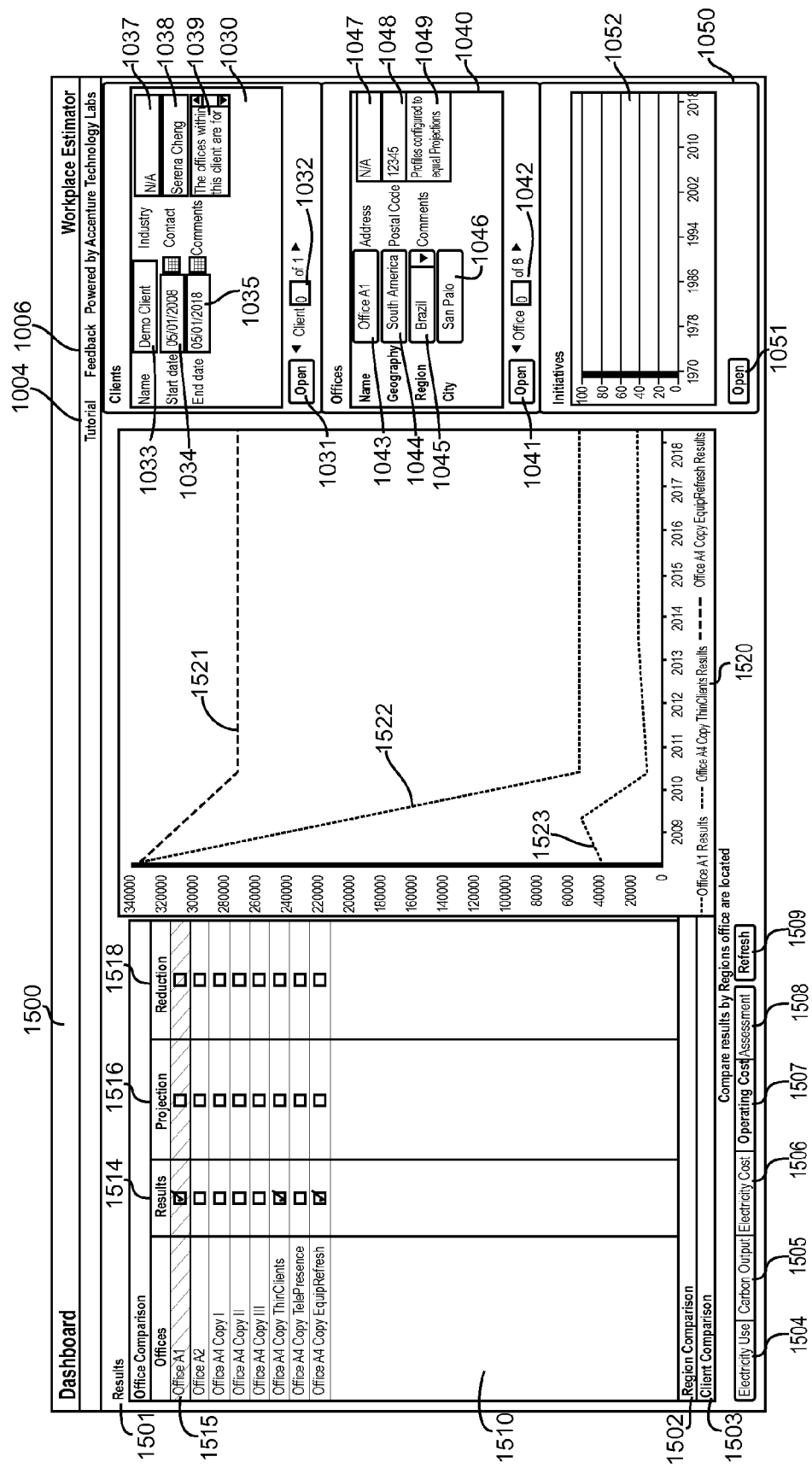

FIG. 15 is a screenshot of a user interface for displaying result data in the system of FIG. 1, or other systems for providing strategies to reduce the carbon output and operating costs of a workplace.

Figure 16:
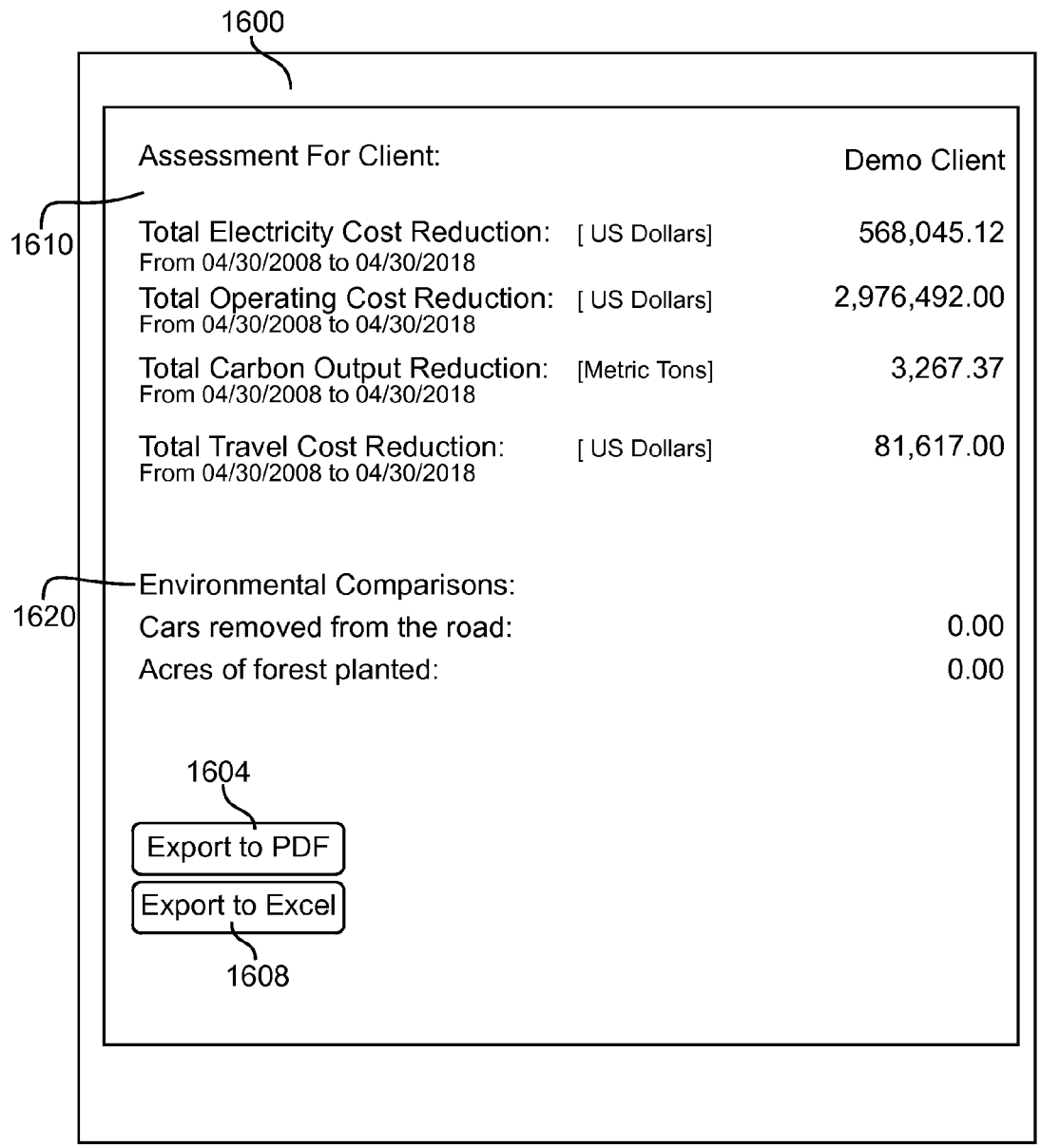

FIG. 16 is a screenshot of a user interface for displaying assessment data in the system of FIG. 1, or other systems for providing strategies to reduce the carbon output and operating costs of a workplace.

Figure 17:
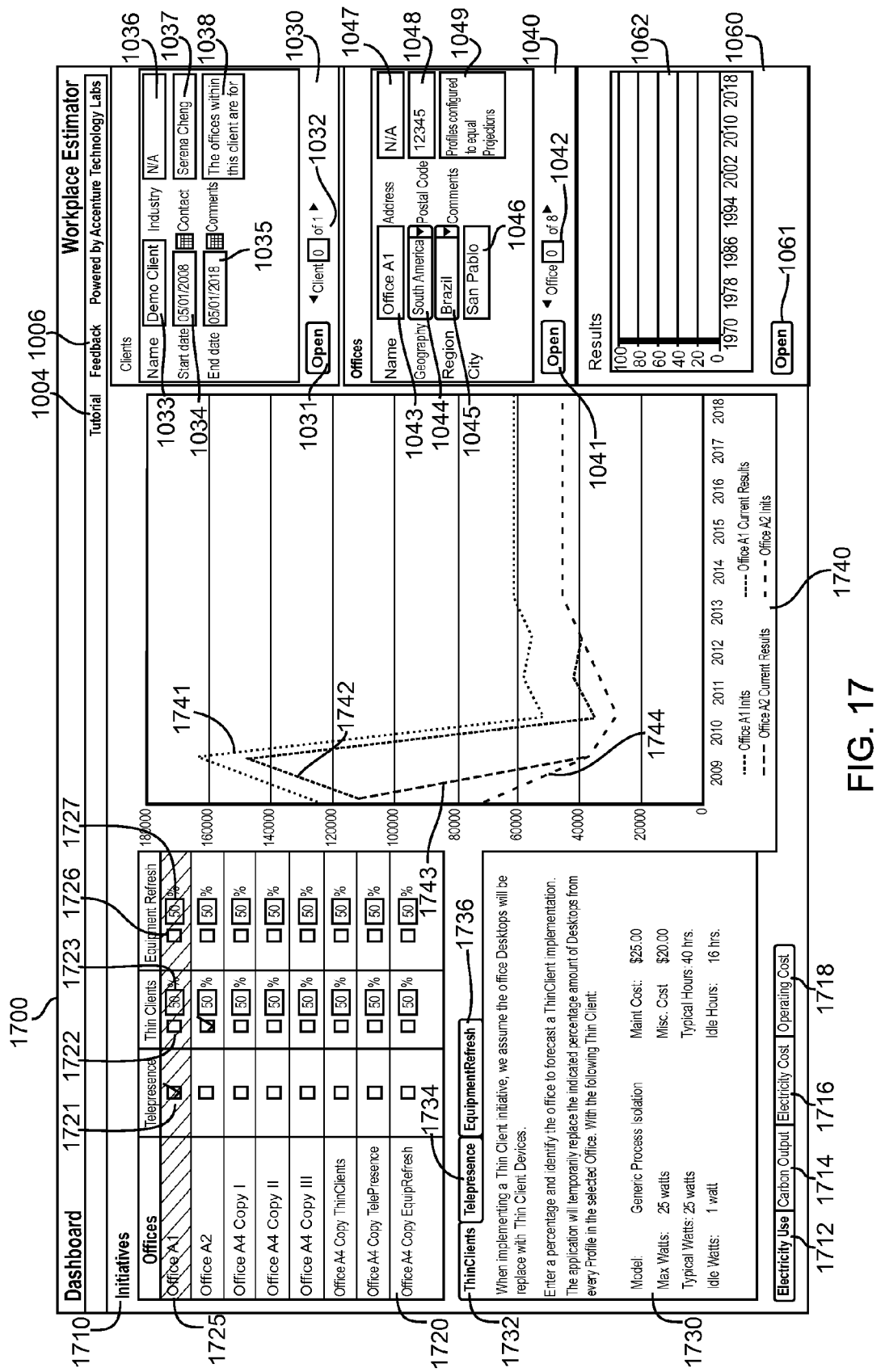

FIG. 17 is a screenshot of a user interface for forecasting the effects of initiatives in the system of FIG. 1, or other systems for providing strategies to reduce the carbon output and operating costs of a workplace.

FIG. 18 is a set of data tables displaying exemplary values associated with generic office equipment used for forecasting the effects of initiatives in the system of FIG. 1, or other systems for providing strategies to reduce the carbon output and operating costs of a workplace.

FIG. 19 is a set of data tables displaying exemplary values associated with thin client equipment used for forecasting the effects of initiatives in the system of FIG. 1, or other systems for providing strategies to reduce the carbon output and operating costs of a workplace.

FIG. 20 is a set of data tables displaying exemplary values associated with telepresence equipment used for forecasting the effects of initiatives in the system of FIG. 1, or other systems for providing strategies to reduce the carbon output and operating costs of a workplace.

Figure 21:
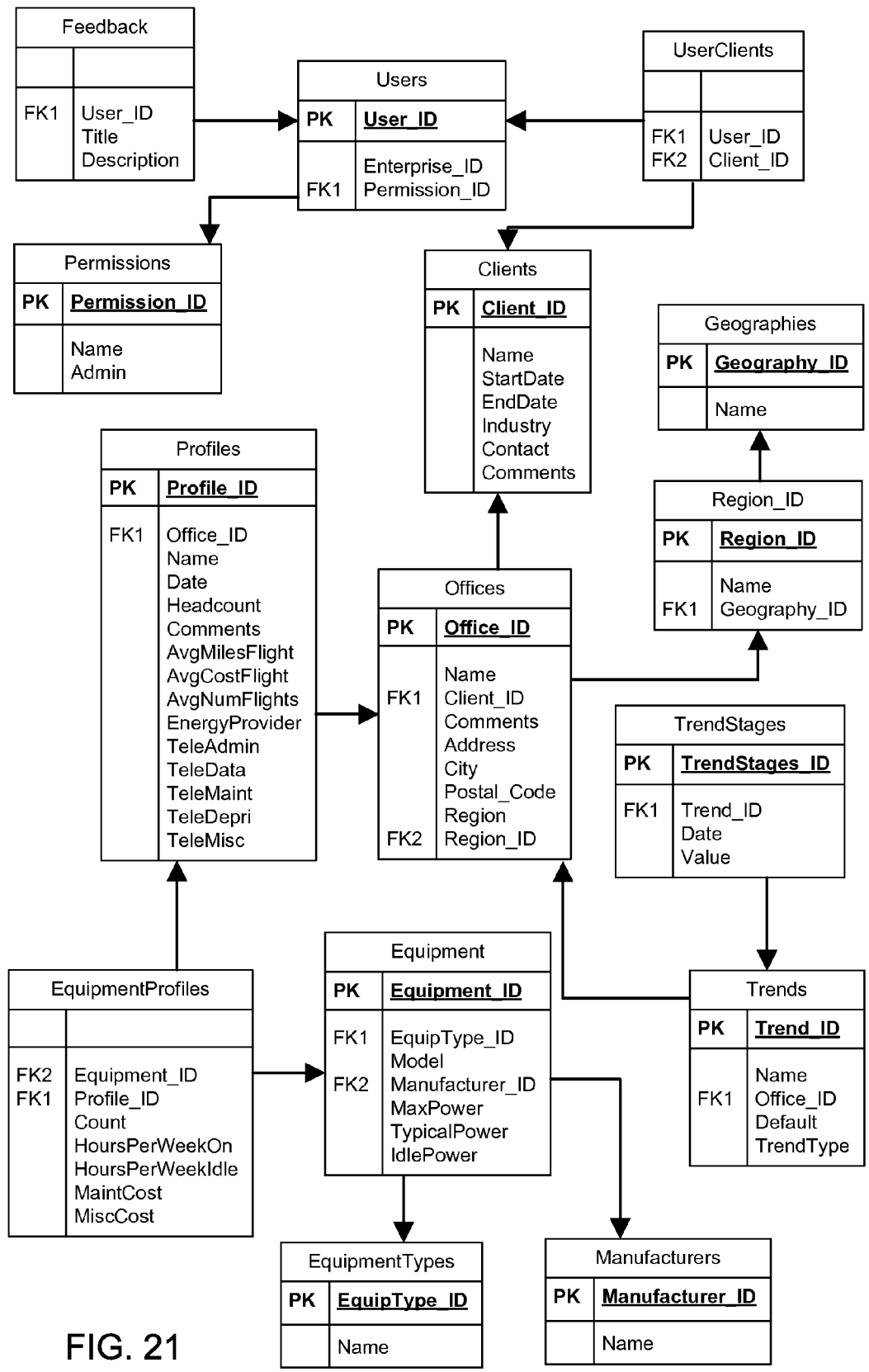

FIG. 21 is a block diagram of an exemplary data schema in the system of FIG. 1, or other systems for providing strategies to reduce the carbon output and operating costs of a workplace.

Figure 2:
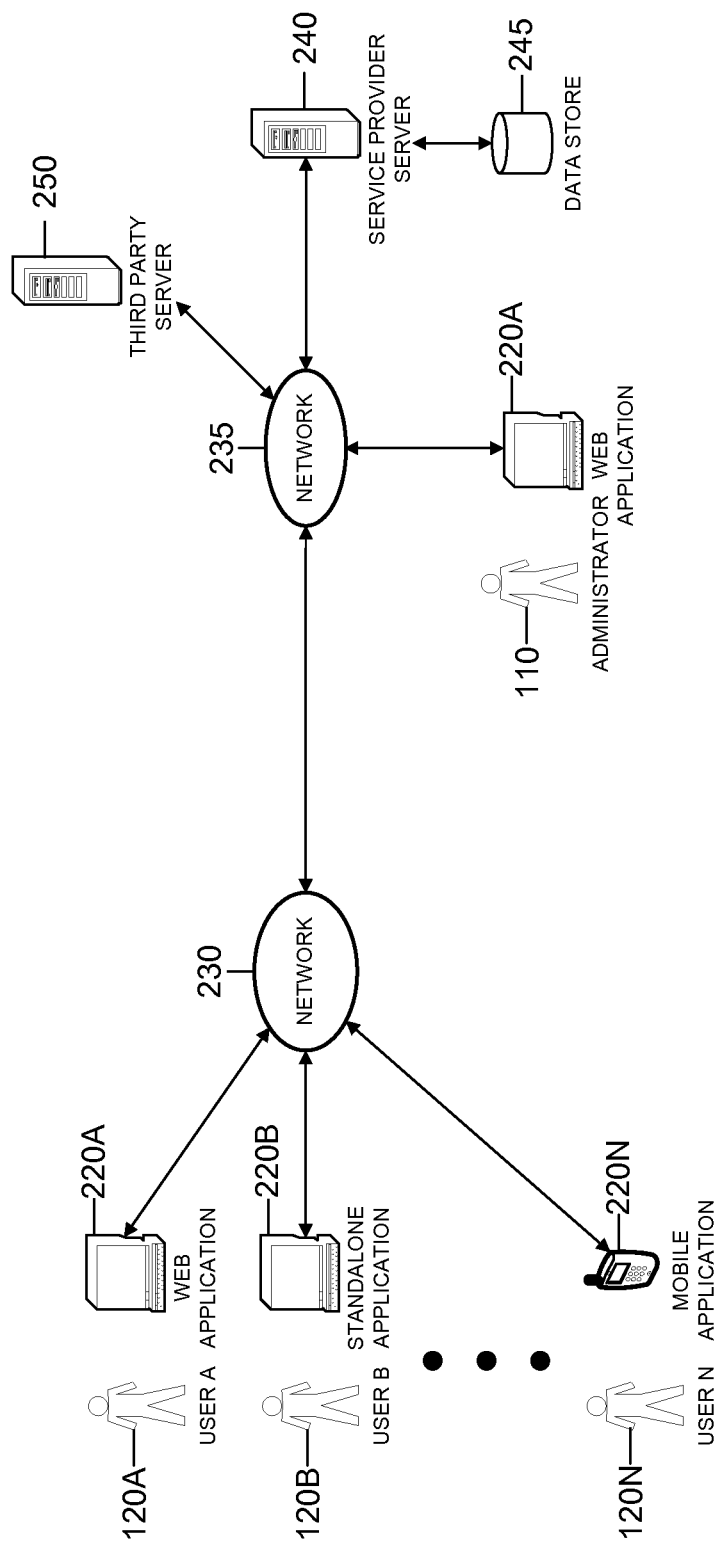
FIG. 2 is a block diagram of a network environment implementing the system of FIG. 1 or other systems for providing strategies to reduce the carbon output and operating costs of a workplace.
Figure 3:
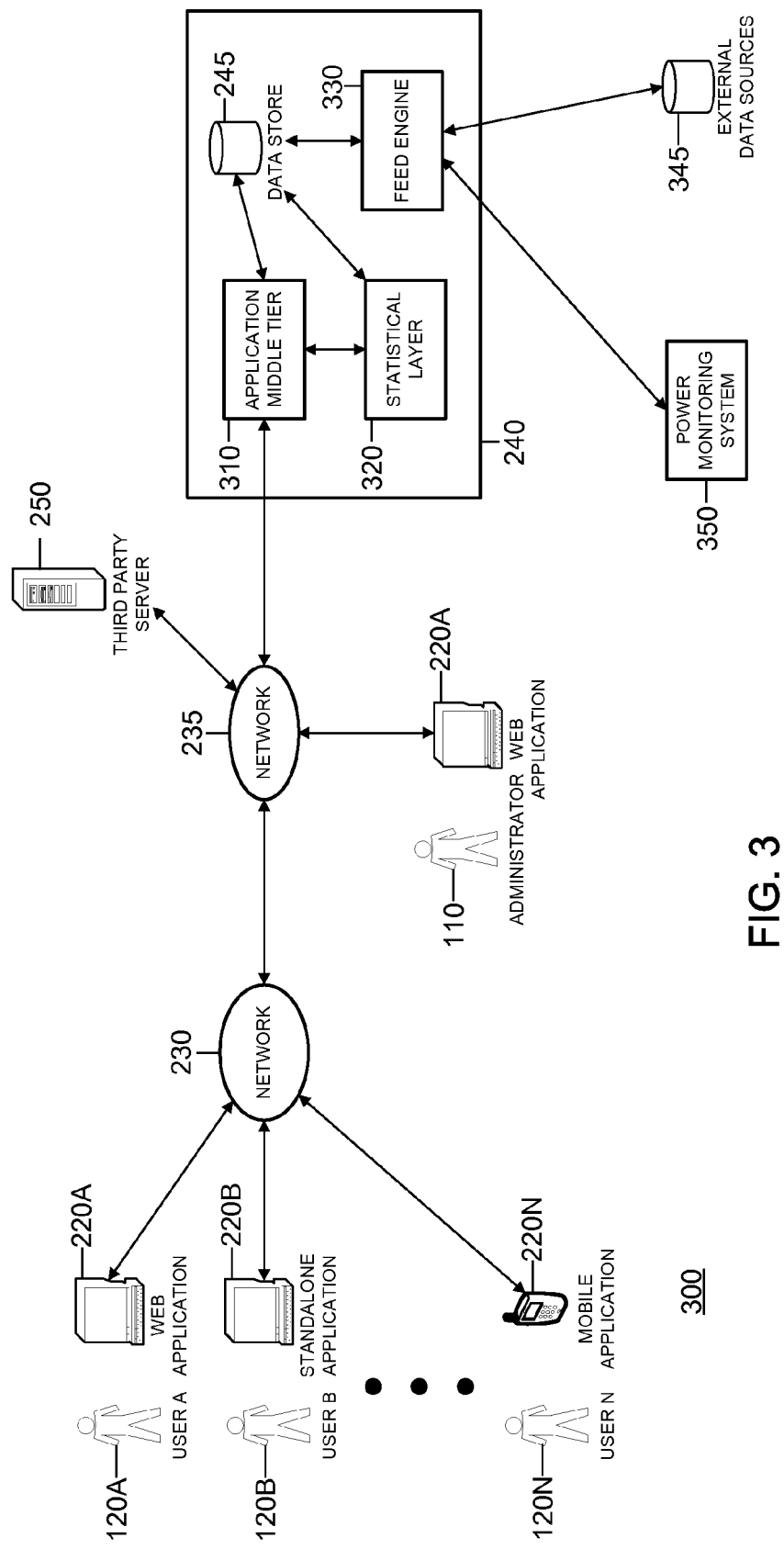
FIG. 3 is a block diagram of a network environment utilizing third party data sources to implement the system of FIG. 1 or other systems for providing strategies to reduce the carbon output and operating costs of a workplace.
Figure 22:
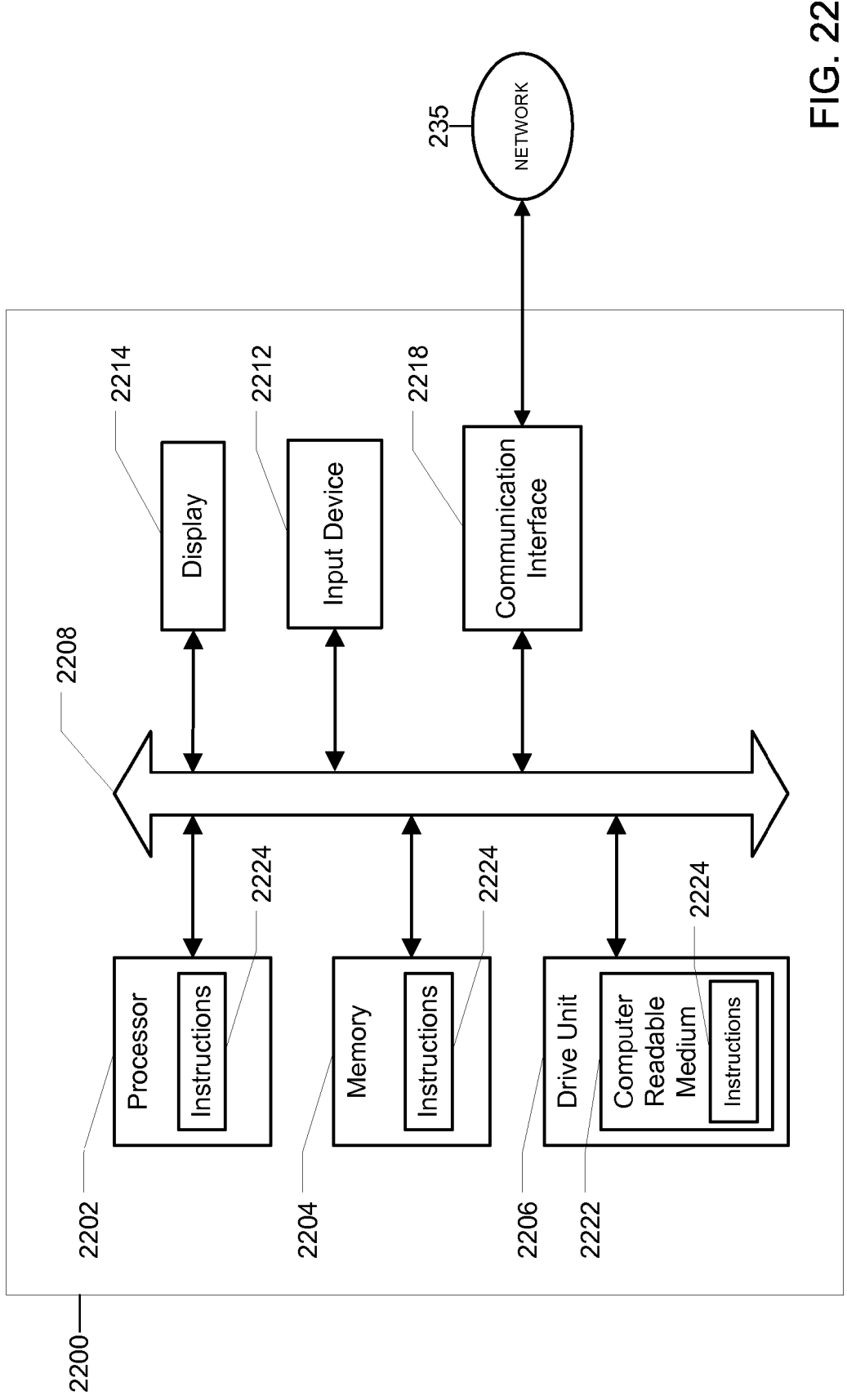

FIG. 22 is an illustration of a general computer system that may be used in the systems of FIG. 2, and FIG. 3, or other systems for providing strategies to reduce the carbon output and operating costs of a workplace.

DETAILED DESCRIPTION

A system and method, generally referred to as a system, may relate to providing strategies to reduce the carbon output, or carbon footprint, of a workplace, and more particularly, but not exclusively, to providing strategies for reducing the carbon output and operating costs associated with the operation of a workplace. The principles described herein may be embodied in many different forms.

The system may provide a user with a decision support tool for creating an energy saving roadmap for an organization's technology implementation strategies. The technology implementation strategies may encompass one or more of the organization's workplaces, such as offices. The energy saving roadmap may incorporate equipment, travel, and behavioral initiatives capable of reducing the energy consumption of the workplaces. The system may analyze the roadmap and provide the user with the cost reductions that may be realized by implementing the roadmap. The cost reductions may include electricity cost reductions, operating cost reductions, and travel cost reductions. The system may also provide the user with the reduction in the carbon output that may be realized by implementing the roadmap. The reductions may be based on user defined forecasts of electricity costs and the amount of carbon generated per kilowatt-hour (kWh) of energy consumed.

The system may allow a user to identify a workplace technology initiative for a workplace and may provide the user with the amount of time required for the cost reductions realized by the initiative to surpass the initial investment of the initiative. The system may also provide the user with additional economic indicators relating to the initiative, such as the return on investment of the initiative and a net present value of the initiative.

The system may allow a user to enter an initial technology configuration of one or more workplaces and may provide the user with one or more behavioral initiatives capable of reducing the energy consumption of the workplace. The system may receive a selection of one or more behavioral initiatives from the user and may notify the workers in the workplace of the action required by the selected initiatives. The system may provide the workers with an incentive for performing the action, or may re-notify the workers for not performing the action. The system may provide the user with a report of the workers in each workplace who have performed the action, and those who have not.

The system may suggest technology configurations of an organization's workplaces capable of minimizing the carbon output and operating costs associated with operating the workplaces. Statistical analysis may be used to leverage historical data from case studies of workplaces similar to the organization's workplaces. The system may suggest technology configurations for the workplaces based on the configurations of similar existing workplaces in the historical data. The system may suggest technology configurations that may allow for the organization to become certified under the International Organization for Standardization.

The system may compare the reductions achieved by a user's strategy roadmap against reductions achieved by strategy roadmaps stored in the system's database. The system may assign a relative rating to the user's strategy roadmap indicating how the strategy roadmap compares with other strategy roadmaps in the system. The system may provide a relative rating for both the financial and environmental impact of the user's strategy roadmap. The system may also provide an overall assessment of the financial and environmental impact of the user's strategy roadmap. The system may display a graph comparing the energy savings achieved by the user's strategy roadmap to the energy savings achieved by other strategy roadmaps in the database.

The system may allow an organization to efficiently manage the carbon impact of their workplace technology, such as desktops, laptops, monitors, across multiple workplaces. The system may enable an organization to determine the carbon impact of their workplace technology, the carbon impact of the employee travel associated with their workplaces, the impact of the hazardous materials found in their workplace technology, and the amount of trees destroyed by papers used in their workplaces. The system may provide one or more graphs displaying the carbon impact of the organization's workplaces.

FIG. 1 provides a general overview of a system 100 for providing strategies to reduce the carbon output and operating costs of a workplace. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more users 120A-N, a service provider 140, and an administrator 110. The users 120A-N may be responsible for maintaining, upgrading, and/or developing the workplace technology configuration of the workplaces of an organization. The service provider 140 may provide an application to the users 120A-N allowing the users 120A-N to view the effects of energy saving strategies, or initiatives, on the costs associated with operating the workplaces. A workplace initiative may be a technology implementation strategy which reduces the carbon emissions resulting from the operation of the workplace, reduces the amount of energy consumed by the operation of the workplace, or reduces the cost associated with operating the workplace. The administrator 110 may be a person or an automated process, and may be responsible for maintaining a database of workplace technology equipment and existing workplace technology configurations. The workplace technology equipment may be used in the workplace technology configurations of the users 120A-N, and the existing workplace technology configurations may be used to provide the users 120A-N with the relative performance of their strategies.

Alternatively or in addition the administrator 110 may be a consultant who provides energy consulting services to one or more clients, such as organizations. The administrator 110 may maintain the data associated with each of the organizations utilizing the consulting services of the administrator 110. The administrator 110 may use the forecasts generated by the system 100 to assist in providing energy consulting services to the organizations.

Alternatively or in addition the administrator 110 may control access permissions of the users 120A-N. The administrator 110 may be able to grant or deny access of the users 120A-N at both a client and a workplace level. The administrator 110 may enable access to the same client for multiple users 120A-N, thereby allowing the users 120A-N to collaborate on changes to the same client.

In operation the service provider 140 may provide the user A 120A with an interface allowing the user A 120A to provide a profile of their organization's workplaces and an initial technology configuration of the workplaces. The user A 120A may provide a separate profile and technology configuration of each workplace operated by the organization, or the user A 120A may provide an aggregate profile and configuration of all of the workplaces operated by the organization. The profile information may describe the geographic location of the workplace, the industry of the workplace, the number of employees, or workers, in the workplace, and/or any general characteristics describing the workplace. The initial configuration of the workplace may include information describing the inventory of information technology ("IT") equipment of the workplace and information describing the average amount of traveling performed by workers at the workplace. The inventory of equipment may include the equipment used by the workers in the workplace, such as laptops, monitors, desktops, printers, thin clients, network devices, or generally any technology utilized in the workplace. The user A 120A may provide specific equipment information, such as the specific models, or may provide a more general description of the equipment.

Alternatively or in addition the inventory of IT equipment may include any telepresence technologies being utilized in the workplace. Telepresence technologies may refer to a set of technologies which allow a person to feel as if they were present, to give the appearance that they were present, or to have an effect, at a location other than their true location. One example of telepresence technology may be video-conferencing technologies. The telepresence inventory may also include the annual estimated costs associated with operating the telepresence technologies.

Alternatively or in addition the inventory of IT equipment may also incorporate the facilities used in the workplace. For example, the lighting, cooling, heating facilities and/or other facilities which consume energy. The infrastructure of the workplace facility itself may be analyzed to determine whether the building infrastructure effects the energy consumption of the workplace. For example, if the building is not properly insulated the workplace may require more energy for heating and cooling systems.

The system 100 may include a database of pre-filled technology equipment information, which the user A 120A may be able to browse or search. The equipment information may include specific data describing workplace IT equipment, such as the make and model of the equipment, the energy consumed by the equipment, the annual operating cost of the equipment, or generally any data describing IT equipment. The administrator 110 may maintain the database and may update the database as new information regarding IT equipment becomes available. The administrator 110 may manually update the database or the database may be automatically updated by a data feed.

Once the user A 120A has provided the workplace technology configuration of their organization's workplaces, the user A 120A may begin to develop a workplace technology strategy. The user A 120A may select one or more energy saving initiatives for each workplace. The initiatives may represent one or more methods for reducing the carbon emissions attributable to the operation of the workplace. The initiatives may relate to transitioning to more energy efficient technology equipment, such as transitioning to a thin client infrastructure, reducing the amount of air travel performed by workers in the workplace, such as by implementing telepresence technologies, transitioning the workers in the workplace towards more energy efficient behaviors, such as turning on power save functionality, or generally any initiative that may reduce the carbon output associated with the workplaces.

In the case of thin clients, desktops may be phased out in favor of a mainframe environment with thin client terminals and a super computer mainframe. The use of thin clients may reduce the number of times new equipment needs to be purchased. Furthermore, the telepresence technology may be used to reduce the travel requirements of the organization, thereby reducing the travel costs and carbon emissions associated with air travel.

In order to accurately measure the effects of the workplace technology strategy, the user A 120A may provide forecasts for the change in electricity costs, and the change in the amount of carbon generated per kilowatt-hour of energy consumed. The system 100 may apply the forecasts provided by the user A 120A to the workplace technology configurations and initiatives identified by the user A 120A. The system 100 may generate one or more graphs demonstrating the effects of the forecasted changes on the operating and environmental costs associated with operating the workplaces over a period of time. The user A 120A may use the information provided in the graphs to further refine the configuration of their workplaces.

Alternatively or in addition the system 100 may process the initial workplace technology configuration provided by the user A 120A, and the initiatives selected by the user A 120A, to provide recommended future configurations of the workplace of the user A 120A. The recommended configurations may include estimates of the equipment required for the implementation of the initiatives at each workplace.

The recommended configurations may be based on historical workplace technology configurations maintained by the administrator 110. The historical workplace technology configurations may include information regarding the equipment and performance of existing workplaces. The system 100 may identify historical workplace technology configuration data relating to both the workplace profiles provided by the user A 120A and the initiatives selected by the user A 120A.

The system 100 may process the workplace profile data to generate estimate values for the recommended workplace technology configuration of the user A 120A. The user A 120A may accept the estimate values of the system 100 or may modify the configuration based on their own assessment of the forecasted reduction values.

Alternatively or in addition the system 100 may automatically analyze the workplace configurations identified by the user A 120A to determine whether the workplace configurations may be modified to increase the energy and/or cost saving efficiencies. The system 100 may recommend modifications to the configurations which may result in more efficient energy use by the organization.

Once the user A 120A has determined their preferred workplace technology configurations, the system 100 may rate the overall workplace configuration of the organization based on other configurations stored in the database. The rating may be based on the carbon output savings achieved by the workplace technology configuration and/or the cost savings achieved by the workplace technology configuration. The system 100 may further provide an assessment of the initiatives implemented by the user A 120A from both a financial and environmental impact.

The user A 120A may use the system 100 to view the effects of multiple waves of workplace technology initiatives. For example, the user A 120A may wish to implement a thin client initiative over a period of time, followed by a telepresence initiative over a different period of time. The system 100 may allow the user A 120A to define the periods of time over which the initiatives may be implemented. The system 100 may generate graphs or other visualization data showing the aggregate effects of the initiatives on carbon emissions and cost savings. Alternatively or in addition the system 100 may recommend the most efficient order to implement the initiatives based on the electricity and carbon trends provided by the user A 120A.

The system 100 may provide the user A 120A with quantitative financial measurements for each initiative. For example, the system 100 may provide the user A 120A with the reduction in costs achievable by the initiative, such as operating costs, electricity costs and travel costs. The system 100 may provide the user with the return on investment of each initiative and the net present value of each initiative. The system 100 may also provide the user A 120A with the amount of time until the aggregate annual savings achieved by the initiative offset the initial investment required by the initiative.

The system 100 may provide the user A 120A with the carbon impact of the initiative, such as the reduction in carbon emissions attributable to the workplace. The system 100 may provide the user A 120A with real world environmental comparisons of the carbon impact, such as the number of cars removed from the road or the number of acres of forest planted.

FIG. 2 provides a simplified view of a network environment 200 implementing the system of FIG. 1 or other systems for providing strategies to reduce the carbon output and operating costs of a workplace. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 200 may include one or more users 120A-N, an administrator 110, a service provider server 240, a third party server 250, a data store 245, networks 230, 235, and one or more web applications, standalone applications, mobile applications 220A-N, which may collectively be referred to as client applications.

Some or all of the service provider server 240 and the third party server 250 may be in communication with each other by way of network 235. The administrator 130 may use a web application 220A to interface with the service provider server 240 and maintain the historical workplace configuration data. Alternatively or in addition the administrator 110 may use a mobile application 220N or a standalone application 220B to interface with the service provider server 240.

The networks 230, 235 may include wide area networks (WAN), such as the Internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet, or the like.

The web applications, standalone applications and mobile applications 220A-N may be connected to the network 230 in any configuration that supports data transfer. This may include a data connection to the network 230 that may be wired or wireless. Any of the web applications, standalone applications and mobile applications 220A-N may individually be referred to as a client application. The web application 220A may run on any platform that supports web content, such as a web browser or a computer, a mobile phone, personal digital assistant (PDA), pager, network-enabled television, digital video recorder, such as TIVO®, automobile and/or any appliance or platform capable of data communications. The web application 220A may support a rich internet application implemented with the ADOBE FLEX® technologies. Alternatively or in addition the web application 220A may be developed using one or more of the following technologies: ADOBE FLEXBUILDER 3, ADOBE FLEX SUBCLIPSE, or generally any web development technologies.

The standalone application 220B may run on a machine that may have a processor, memory, a display, a user interface and a communication interface. The processor may be operatively connected to the memory, display and the interfaces and may perform tasks at the request of the standalone application 220B or the underlying operating system. The memory may be capable of storing data. The display may be operatively connected to the memory and the processor and may be capable of displaying information to the user B 120B. The user interface may be operatively connected to the memory, the processor, and the display and may be capable of interacting with a user B 120B. The communication interface may be operatively connected to the memory, and the processor, and may be capable of communicating through the networks 230, 235 with the service provider server 240. The standalone application 220B may be programmed in any programming language that supports communication protocols. These languages may include: SUN JAVA®, C++, C#, ASP, SUN JAVASCRIPT®, asynchronous SUN JAVASCRIPT®, or ADOBE FLASH ACTIONSCRIPT®, ADOBE FLEX®, amongst others.

The mobile application 220N may run on any mobile device that may have a data connection. The data connection may be a cellular connection, a wireless data connection, an internet connection, an infra-red connection, a Bluetooth connection, or any other connection capable of transmitting data.

The service provider server 240 may include one or more of the following: an application server, a mobile application server, a data store, a database server, and a middleware server. The service provider server 240 may exist on one machine or may be running in a distributed configuration on one or more machines.

The service provider server 240 and client applications 220A-N may be one or more computing devices of various kinds, such as the computing device in FIG. 22. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web application 220A may employ the Hypertext Transfer Protocol ("HTTP") to request information, such as a web page, from a web server, which may be a process executing on the service provider server 240.

There may be several configurations of database servers, application servers, mobile application servers, and middleware applications included in the service provider server 240. The data store 245 may be part of the service provider server 240 and may be a database server, such as MICROSOFT SQL SERVER®, ORACLE®, IBM DB2®, SQLITE®, or any other database software, relational or otherwise. The data store 245 may store the historical workplace information. The application server may be APACHE TOMCAT®, MICROSOFT IIS®, ADOBE COLDFUSION®, or any other application server that supports communication protocols. The middleware application may be any middleware that provides additional functionality between the application server and the clients 220A-N, such as a PHP: HYPERTEXT PREPROCESSOR ("PHP"), or a PYTHON framework, such as a DJANGO framework.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices.

In operation the user A 120A may access the service provided by the service provider 140 through the web application 220A and the network 230. The web application 220A may download a client side application from the service provider server 240 using ADOBE FLASH PLAYER 9. The web application 220A may request data from the middleware application, such as a PHP server. The PHP server may query the information from the data store 245 and communicate the information to the web application 220A. The user A 120A may interact with the client side application through the web application 220A. The data may be passed between the web application 220A and the database 245 via the PHP server. The majority of the calculations may be performed on the service provider server 240, although some calculations may be completed on the web application 220A in order to speed up response times.

Alternatively or in addition the client applications 220A-N may be able to function in both an online and an offline mode. The client applications 220A-N may include a locally cached data store for offline operations. The local and remote data store 245 may synchronize when online operations are available. In one example the system 100 may use ADOBE AIR® to implement the online and offline functionality.

FIG. 3 provides a simplified view of a network environment 200 utilizing third party data sources to implement the system of FIG. 1 or other systems for providing strategies to reduce the carbon output and operating costs of a workplace. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 300 may represent an alternative server side architecture to the network environment 200. The network environment 300 may include one or more users 120A-N, an administrator 110, a service provider server 240, a third party server 250, a data store 245, an application middle tier 310, a statistical layer 320, a feed engine 330, a power monitoring systems 350, networks 230, 235, and one or more web applications, standalone applications, mobile applications 220A-N, which may collectively be referred to as client applications.

In the network environment 300 external data sources 345 may provide historical workplace configuration data to the service provider server 240 via the feed engine 330. The historical workplace configuration data may then be stored in the data store 245. The historical workplace configuration data may include any data describing existing or past configurations of workplaces. The feed engine 330 may also be used to receive any other data relevant to the system 100, such as real-time information on electricity prices, or the amount of carbon generated carbon per kWh of energy consumed. The external data sources 345 may be Internet based, such as a third party server 250. Alternatively or in addition the energy consumption of the workplaces may be received from the power monitoring systems 350. The power monitoring systems 350 may also be third party servers 250 and may provide real-time visibility into electricity consumption of the workplace. The equipment in the workplace may be attached to energy meters, such as the EIG SHARK 100-S ELECTRONIC SUB-METER. The energy meters may be capable of transmitting energy use data over the networks 230, 235 to the power monitoring system 350, or directly to the service provider server 240. The math/statistics layer 320 may be an application used to perform advanced modeling, statistics, and mathematics calculations. The statistical layer 320 may allow for more sophisticated analytics to be applied with the application.

Figure 4:
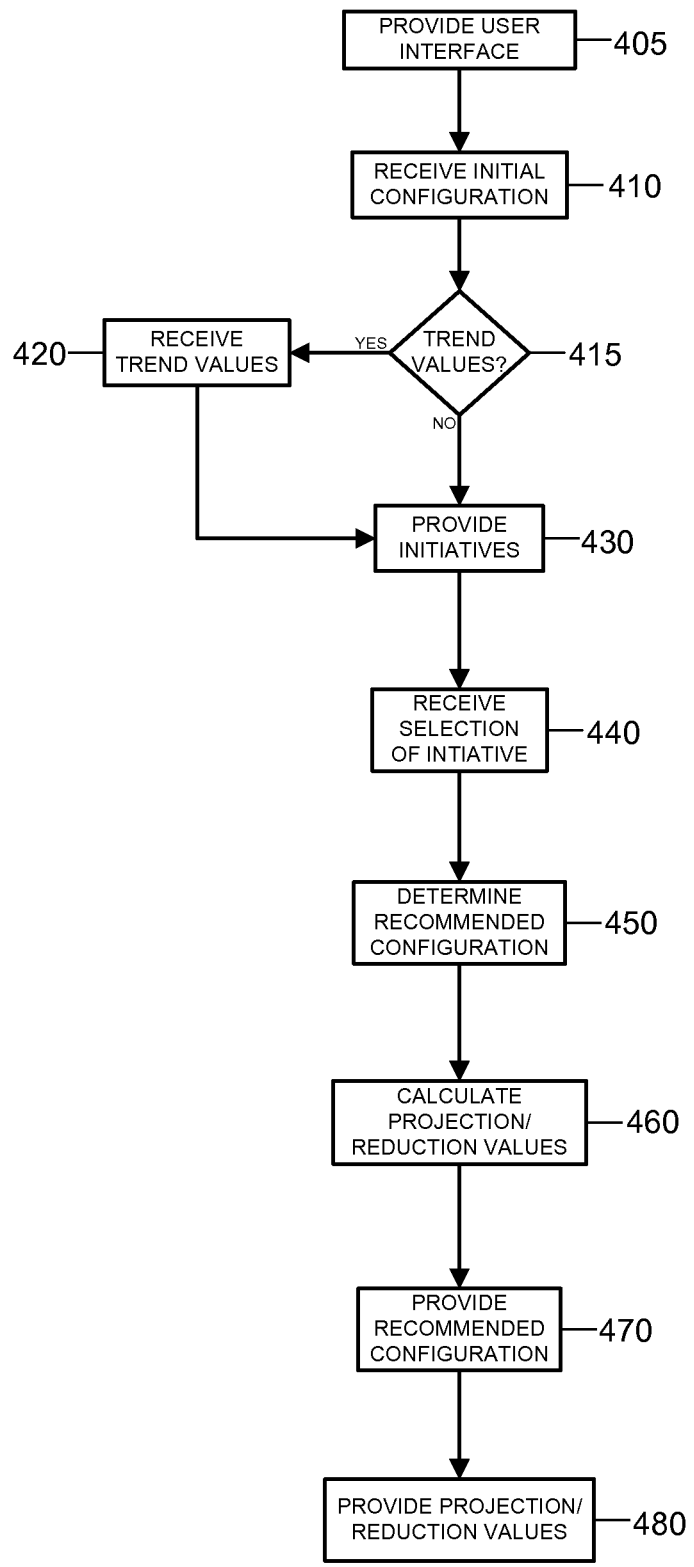
FIG. 4 is a flowchart illustrating the operations of the system of FIG. 1, or other systems for providing strategies to reduce the carbon output and operating costs of a workplace.

FIG. 4 is a flowchart illustrating the operations of the system of FIG. 1, or other systems for providing strategies to reduce the carbon output and operating costs of a workplace. At block 405 the service provider server 240 may provide a user interface to the user A 120A, such as the user interfaces described in FIGS. 10-17. The service provider 240 may provide the user interface to the user A 120A over the networks 230, 235. At block 410 the service provider server 240 may receive a workplace profile and an initial workplace technology configuration of one or more workplaces from the user A 120A. The workplace profile may include the number of employees at the workplace, the location of the workplace, the industry associated with the workplace, or generally any information that may describe the workplace. The workplace technology configuration may include an inventory of the IT equipment utilized by each workplace, such as laptops, desktops, monitors, thin clients, or other technology equipment. The workplace profile and technology equipment may be provided separately for each workplace or may be provided in the aggregate for the organization as a whole.

Alternatively or in addition the workplace technology configuration may include a description of any telepresence equipment being utilized at the workplace. Telepresence may equipment may include videoconferencing equipment, conference bridging equipment, or generally any equipment capable of affecting a telepresence. A telepresence implementation may allow an organization to reduce the amount of air travel of its employees.

Alternatively or in addition the initial workplace technology configuration or the workplace profile may also include information describing the air travel associated with the operation of the workplace. The air travel information may include the average number of flights per worker per year, the average cost per flight per worker, the average number of miles per flight per worker or generally any information describing the air travel associated with the workplace.

Alternatively or in addition the service provider 140 may have access to the cost of flights from city to city, such as through an external data source 345. The service provider 140 may be able to provide the user A 120A with current averages for flights from workplace to workplace. The user A 120A may accept the averages or modify the values for their organization.

At block 415 the system 100 may determine whether the user A 120A wishes to provide trend values. The user A 120A may provide trend values to forecast changes in electricity costs and changes in the carbon emission per kWh of electricity consumed. If, at block 415, the user A 120A wishes to provide trend values the system 100 may move to block 420. At block 420 the service provider server 240 may receive trend values from the user A 120A. If, at block 415, the user A 120A does not wish to provide trend values, the service provider server 240 may use default values for the trend values. The default values may be an average of all the trend values provided by the other users 120B-N. Alternatively or in addition the service provider server 240 may retrieve trend values from one of the external data sources 345, such as from an analyst's forecast, an industry expert's forecast, a government forecast, or historical trend data.

At block 430 the service provider 140 may process the initial workplace configuration data of the user A 120A to recommend energy saving initiatives which may reduce the operating costs and/or carbon output of the workplace. The service provider 140 may use expert data provided by the administrator 110 to determine areas where the energy efficiency of the workplace technology configuration may be improved. For example, if the initial configuration and/or profile indicate that the workplace is heavily dependent on air travel, the service provider 140 may recommend a telepresence initiative to reduce the air travel associated with the workplace. If the initial configuration data indicates that the workplace relies extensively on standalone computing equipment the service provider 140 may recommend a thin client initiative to migrate the workplace towards a thin client/mainframe environment. If the service provider 140 determines that the workplace is generally utilizing equipment that is not energy efficient the service provider 140 may recommend an equipment refresh implementing energy efficient equipment.

If the service provider 140 determines that the workplace is using disparate printers, fax machines and copiers, the service provider 140 may recommend an equipment refresh of all-in-one equipment capable of performing printing, faxing and copying functions. If the service provider 140 determines that the initial equipment configuration is optimal for minimizing operating costs and carbon output, the service provider 140 may recommend one or more behavior initiatives. The behavior initiatives may attempt to transition the behavior of the workers at the workplace towards more energy efficient behaviors, such as turning off IT equipment when not in use, telecommuting from a home office, carpooling, printing on both sides of each sheet of paper, or generally any behavior which may reduce the carbon emissions or operating costs associated with the workplace. Alternatively or in addition the service provider 140 may provide all of the initiatives to the user A 120A regardless of the initial configuration provided by the user A 120A.

At block 440 the service provider 140 may receive a selection of one or more initiatives from the user A 120A. The selection of the initiative may include a value associated with the initiative, such as a percentage of equipment to be affected by a thin client or an equipment refresh initiative, a percentage of employees projected to comply with a behavior initiative, or generally any value capable of refining the selected initiative. At block 450 the service provider 140 may process the initial configuration data, the selected initiative, and any associated values to determine a recommended workplace technology configuration. For example, if the user A 120A selected an energy efficient equipment refresh initiative, and indicated that 50% of the equipment should be refreshed, the service provider 140 may determine a recommended configuration where 50% of the initial equipment is replaced with energy efficient equipment. If the user A 120A selected a thin client initiative and indicated that 50% of the equipment should be migrated to thin clients, the service provider 140 may determine a recommended configuration where 50% of the computers are replaced with thin clients and one or more mainframe servers. If the user A 120A selected a telepresence initiative the service provider 140 may determine a recommended configuration that includes telepresence technologies.

At block 460 the service provider 140 may calculate the projection values of an implementation of the recommend configuration and an implementation of the initial configuration based on the trend values. The projection values may include the projected electricity costs, projected operating costs and projected carbon output. The service provider 140 may also calculate reduction values associated with the reductions in cost and carbon output achievable by the recommended configuration over the initial configuration. The reduction values may include the reduction in electricity cost, reduction in operating cost, and reduction in carbon output. Alternatively or in addition the service provider 140 may determine environmental comparison values which may indicate the effect the reduction in carbon output may have on the environment, such as the number of acres of forest that may be saved, the number of cars which may be removed from the road, or generally any environmental metric which may provide the user A 120A with a real world reference to the reduction in carbon output. The reduction values may be calculated by taking the difference between the projection values associated with the initial configuration and the projection values associated with the recommended configuration. The calculation of the projection values is discussed in more detail in FIG. 5 below.

At block 470 the service provider 140 may provide the recommended configuration to the user A 120A, such as through the user interface. At block 480 the service provider 140 may provide the calculated projection values and reduction values to the user A 120A, such as through the user interface. The system 100 may repeat the operations of FIG. 4 for each workplace of the organization maintained by the user A 120A. Alternatively or in addition the operations of FIG. 4 may be performed on the aggregate collection of all the workplaces of the organization maintained by the user A 120A.

Figure 5:
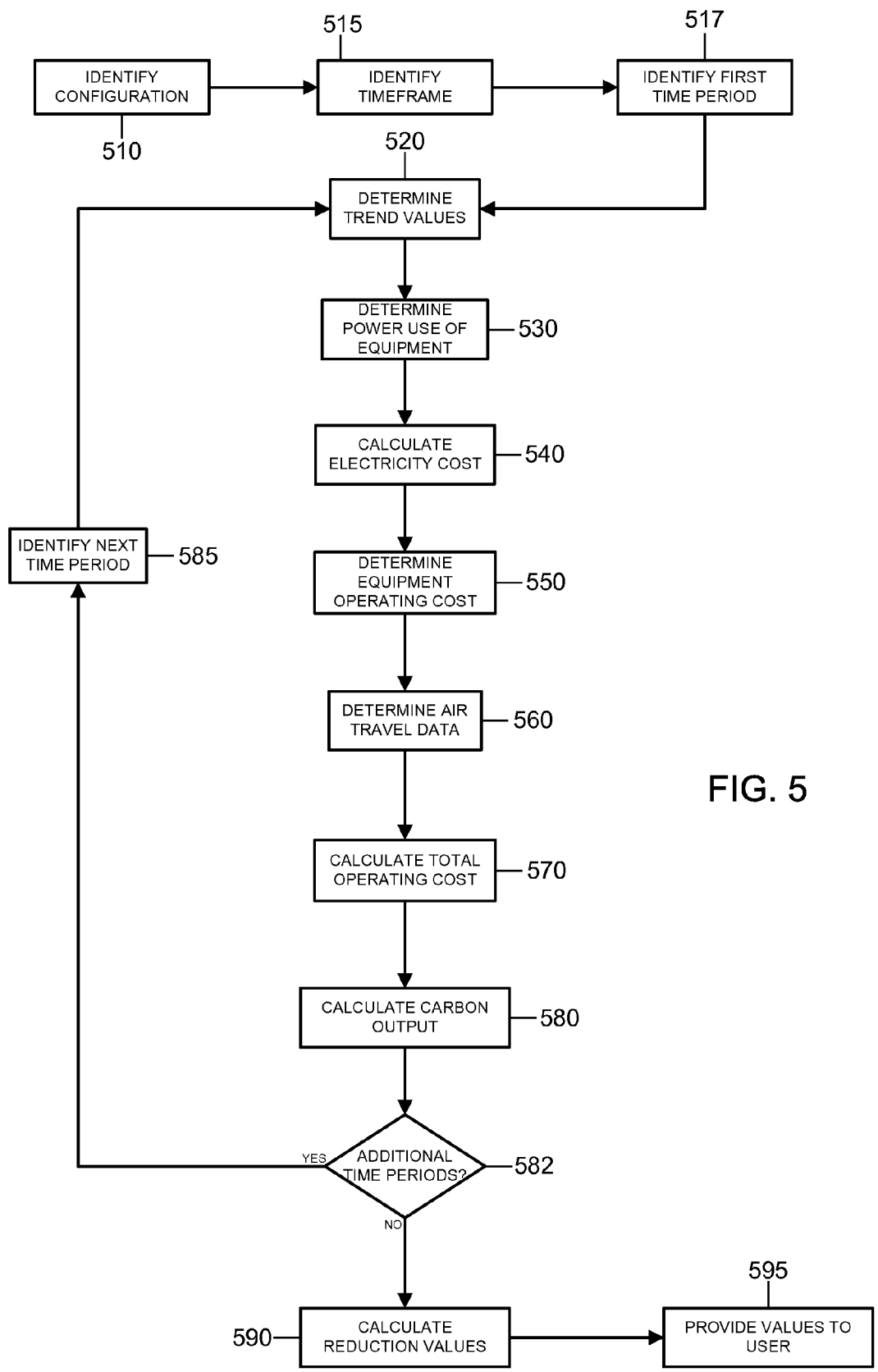
FIG. 5 is a flowchart illustrating the operations of determining the total carbon output of a workplace in the system of FIG. 1, or other systems for providing strategies to reduce the carbon output and operating costs of a workplace.

FIG. 5 is a flowchart illustrating the operations of determining the total carbon output of a workplace in the system of FIG. 1, or other systems for providing strategies to reduce the carbon output and operating costs of a workplace. At block 510 the system 100 may identify the technology configuration of a workplace provided by the user A 120A. The identified configuration may describe the technology configuration of a single workplace, multiple workplaces within a region, or the aggregate of all of the workplaces of the organization maintained by the user A 120A. At block 515 the service provider 140 may identify the timeframe over which the configuration may be implemented. The timeframe may encompass several time periods, such as years, which may be provided by the user A 120A. Alternatively or in addition the service provider 140 may automatically determine the timeframe based on the amount of technology affected by any initiatives selected by the user A 120A. Alternatively or in addition the service provider 140 may determine the timeframe based on a budget set by the user A 120A. The user A 120A may provide a monetary amount per year to spend on equipment upgrades, or refreshes, and the service provider 140 may determine the number of years necessary to implement any initiatives selected by the user A 120A.

At block 517 the service provider 140 may identify the first time period in the timeframe, such as the first year. At block 520 the service provider 140 may determine the value of the electricity costs and the tons of carbon generated by each kWh of electricity consumed for the time period currently being analyzed. The trend values may be inputted by the user A 120A or may be retrieved from an external data source 345. Alternatively or in addition the administrator 110 or other expert user may provide the trend values.

At block 530 the service provider 140 may determine the power consumption of the technology equipment over the time period being analyzed. The service provider 140 may store energy use information for each piece of equipment in the data store 245. The energy use information may be entered by the administrator 110, or an expert user. Alternatively or in addition the energy use information may be retrieved from an external data source 345 or the power monitoring system 350. The energy use information for the equipment may include a maximum number of watts used per hour, a typical number of watts used per hour, and an idle number of watts used per hour. Certain equipment, such as telepresence equipment, or thin client equipment, may have specialized power consumption values. For example, the thin client power consumption may depend on the thin client isolation configuration, and the telepresence power consumption may incorporate the necessary support equipment and/or may vary during an active call, such as a videoconference call. Exemplary energy use values may be found in FIGS. 18-20. For each piece of equipment the service provider 140 may determine the number of hours the equipment will be run at the maximum level, the typical level or the idle level over the time period. The number of hours the equipment will be run at each level over the time period is then multiplied by the watts consumed for the level for the particular piece of equipment. The power use for each piece of equipment is added together to determine the total power use of the equipment for the time period. Alternatively or in addition the system 100 may assume that the thin client equipment runs at the maximum wattage at all times.

At block 540 the service provider 140 may calculate the electricity cost for the time period and the configuration. The electricity cost may be calculated by multiplying the forecasted cost of electricity for the time period by the total power use of the equipment for the time period. The electricity cost for the time period may be added to the aggregate total electricity cost for the timeframe.

At block 550 the service provider 140 may determine the equipment operating cost for the configuration for the time period. The equipment operating cost may be determined by adding the operating cost of each piece of equipment for the time period. FIGS. 18-20 may provide exemplary annual operating costs for various pieces of equipment. The operating cost of standard equipment for the time period, such as monitors, laptops, printers, may be calculated by adding the equipment maintenance cost and the equipment miscellaneous cost of the time period. The operating cost of telepresence equipment for the time period may be calculated by adding the telepresence equipment's administration cost, data cost, maintenance cost, depreciation cost and miscellaneous cost for the time period. The equipment operating cost may be determined by adding these values together.

At block 560 the service provider 140 may determine the air travel data associated with the workplace for the time period. The air travel data may include the number of flights from the workplace for the time period, the average miles per flight from the workplace for the time period, and the average cost of a flight from the workplace for the time period. The air travel data may be provided by the user A 120A with the profile for the workplace. Alternatively or in addition the air travel data may be provided by the administrator 110, or other expert user, or the air travel data may be based on averages for the industry received from external data sources 345.

At block 570 the service provider 140 may calculate the total operating cost for the workplace over the time period. The total operating cost for the workplace may be the sum of the operating cost of the equipment, the operating cost of the telepresence equipment and the travel operating cost. The travel operating cost may be calculated by multiplying the average cost of a flight from the workplace during the time period by the average number of flights from the workplace during the time period. The total operating cost for the time period may be added to the aggregate operating cost for the timeframe.

At block 580 the service provider 140 may calculate the total carbon output of the workplace during the time period. The total carbon output of the workplace may be determined by adding the carbon output of the equipment and the carbon output associated with air travel. The carbon output of the equipment may be calculated by multiplying the total power use of all equipment by the forecasted tons of carbon emitted from each kilowatt of energy consumed. The carbon output associated with the air travel may be determined by multiplying the average number of flights by the average miles per flight. The total may then be multiplied with a constant relating to the tons of carbon emitted per mile of flight flown, such as 0.00045. The constant may be retrieved from an external data source 345. The total carbon output of the time period may be added to the aggregate total carbon output for the timeframe.

At block 582 the system 100 may determine whether there are additional periods of time remaining in the timeframe. If the system 100 determines there are additional periods of time remaining in the in timeframe, the system 100 may move to block 585. At block 585 the system 100 may identify the next time period in the timeframe. Once the next time period in the timeframe is identified, the system 100 may return to block 520.

If at block 582, the system 100 determines there are no additional time periods remaining in the timeframe, the system 100 may move to block 590. At block 590 the service provider 140 may calculate the reduction values of the configuration. The reduction values of the configuration may only be calculated if the user A 120A provided an initial configuration and also selected an additional configuration or a recommended configuration. The reduction values may demonstrate the benefits provided by the recommended configuration over the initial configuration for the timeframe. The reduction values may be calculated for the electricity use, electricity cost, carbon output and operating cost. The reduction values may be calculated by subtracting the total values associated with the recommended configuration for the timeframe from the total values associated with the initial configuration for the timeframe. Alternatively or in addition, reduction values may be calculated by subtracting the total forecasted values associated with the initial configuration for the timeframe from the total values associated with the recommended configuration from the timeframe. If the number of workers identified in the recommended configuration differs from the number of workers identified in the initial configuration, the service provider 140 may prorate the values associated with the forecasted configuration before performing the subtraction. The values may be prorated by multiplying each value by the headcount associated with the recommended configuration and dividing the result by the headcount associated with the initial configuration. At block 595 the service provider 140 may provide the determined values to the user A 120A, such as through a user interface.

Alternatively or in addition the service provider 140 may calculate environmental comparison values. The environmental comparison values may provide the user A 120A with a perspective of the potential real world effects of the reduction of carbon output associated with the workplace. The environmental comparisons may include the equivalent number of automobiles removed from the road, or the number of acres of forest that could be planted. The environmental comparison values may be calculated by dividing the amount of carbon generated by a constant. The carbon values may need to be converted from tons into pounds in order to perform the calculation. The value of the constant in regards to the number of cars removed from the road may be 11470, and the constant in regards to the acres of forest planted may be 8066. Alternatively or in addition the value of the constants may be retrieved from an external data source 345.

Figure 6:
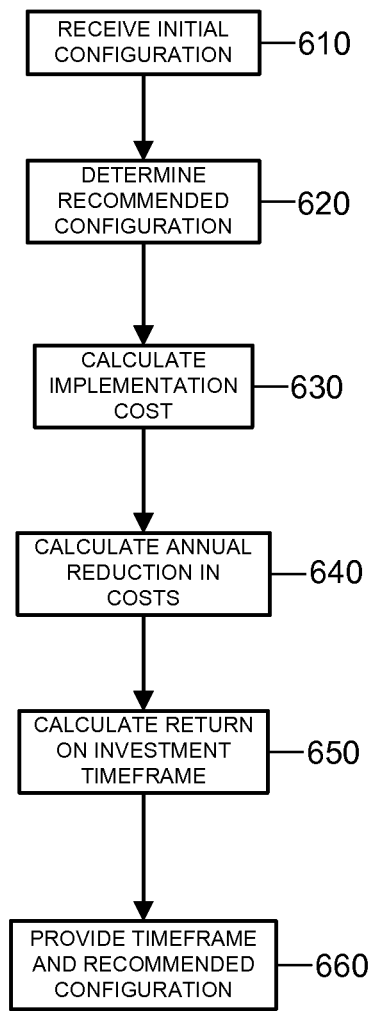
FIG. 6 is a flowchart illustrating the operations of determining a timeframe for a return on an investment in the system of FIG. 1, or other systems for providing strategies to reduce the carbon output and operating costs of a workplace.

FIG. 6 is a flowchart illustrating the operations of determining a timeframe for a return on investment in the system of FIG. 1, or other systems for providing strategies to reduce the carbon output and operating costs of a workplace. At block 610 the service provider 140 may receive an initial configuration of one or more workplaces from a user A 120A. At block 620 the service provider 140 may determine a recommended configuration based on one or more initiatives selected by the user A 120A. Alternatively or in addition the user A 120A may identify a potential future configuration of the workplace. At block 630 the service provider 140 may calculate the cost of implementing the configuration. The cost of implementing the configuration may include the cost of the new equipment, the cost of installing the new equipment, the cost of removing the old equipment, any opportunity cost of implementation, and any increases in operating costs. At block 640, the service provider may calculate the annual reduction in costs as detailed in FIG. 5 above. The annual reduction in costs may include the annual reduction in operating costs, the annual reduction in electricity costs, any annual cost reductions resulting in a lower carbon output, and annual cost reductions associated with alternate disposal methods of the equipment.

At block 650 the service provider 140 may calculate the return on investment timeframe for the recommended configuration. The return on investment timeframe may be the amount of time until the aggregate annual reduction in costs realized by the configuration surpasses the initial cost of implementing the configuration. The service provider 140 may calculate the return on investment timeframe by dividing the implementation cost of the recommended configuration by the annual reduction in costs attributable to the recommended configuration. At block 660 the service provider 140 may provide the recommended or selected configuration and the timeframe to the user A 120A, such as via a web interface.

Alternatively or in addition the service provider 140 may also provide additional financial indicators which may allow the user A 120A to gauge the value of the configuration. The additional indicators may include the return on investment value over a time period and the net present value over a time period of the recommended configuration. The time period may be the amount of time the configuration is expected to be operational. The service provider 140 may calculate the return on investment by first determining the aggregate annual reduction in costs associated with the implementation over the time period. The service provider 140 may then determine the cost of implementing the initiative. The return on investment for the time period may then be calculated by subtracting the implementation cost from the aggregate annual reduction in costs and dividing the result by the cost of the initiative. The service provider 140 may also calculate an after tax return on investment by multiplying the calculated return on investment by the tax rate of the organization and subtracting the result from the calculated return on investment.

The service provider 140 may use the following formula to determine the net present value (NPV) of the configuration:

$$NPV = (-InitialInvestment) + \Sigma_{t=1}^{N}(NetCashflow)/(1+DiscountRate)^t.$$

The InitialInvestment may be the cost of implementing the new equipment, including the installation costs, the removal costs of the old equipment, and the disposal of the old equipment. Alternatively or in addition the opportunity cost of implementation may also be included in the InitialInvestment if the DiscountRate does not represent a return realized from a better opportunity. N may be the total number of time periods the configuration is expected to be operational for, such as a number of years. The NetCashflow may be the operating cost plus the electricity cost of the recommended configuration subtracted from the operating cost plus the electricity costs of the initial configuration. The DiscountRate may be a constant rate which represents the return realized from a better opportunity or the organization's average rate of return on their investments.

Figure 7:
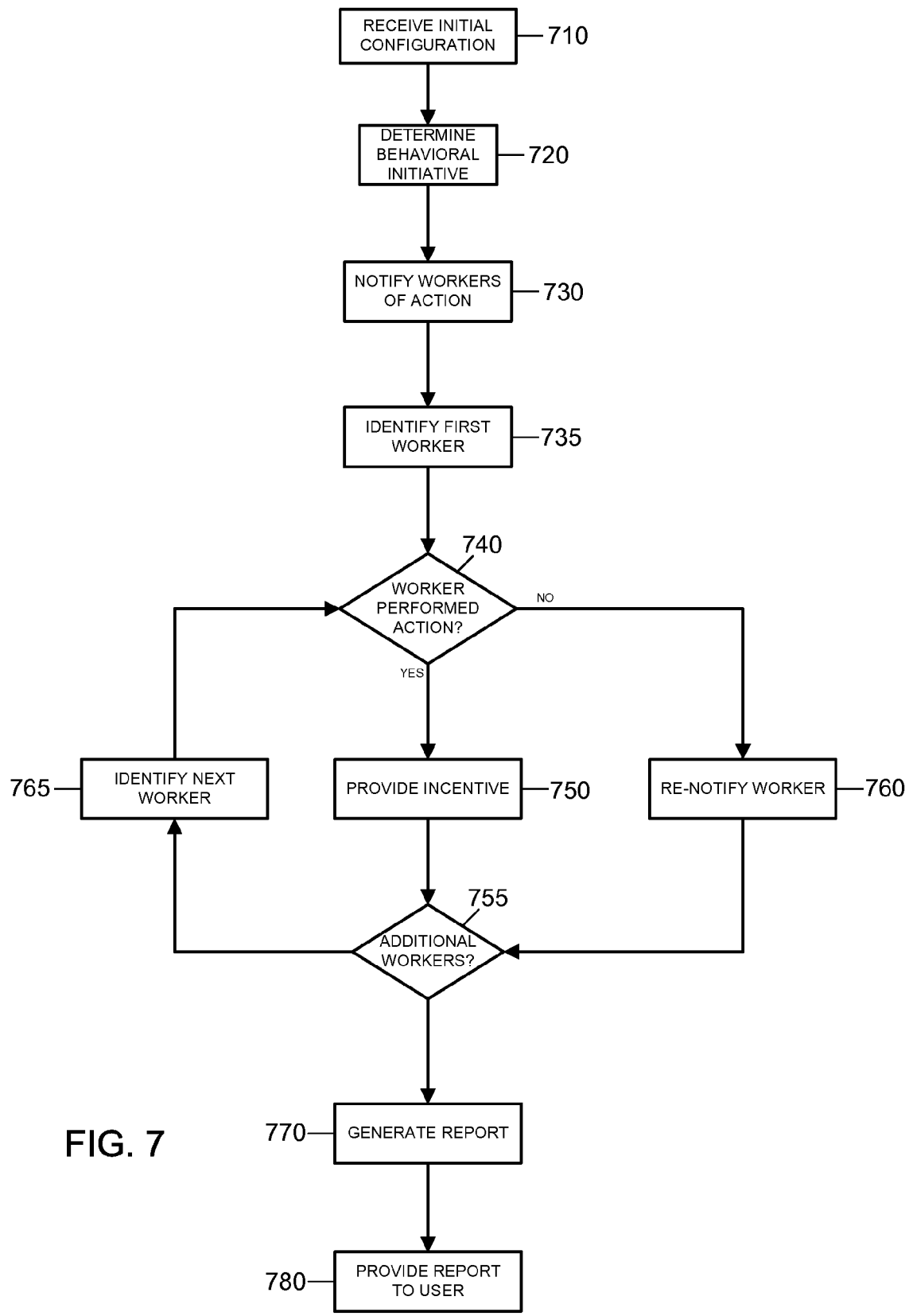
FIG. 7 is a flowchart illustrating the operations of implementing a behavioral initiative in the system of FIG. 1, or other systems for providing strategies to reduce the carbon output and operating costs of a workplace.

FIG. 7 is a flowchart illustrating the operations of implementing a behavioral initiative in the system of FIG. 1, or other systems for providing strategies to reduce the carbon output and operating costs of a workplace. At block 710 the service provider 140 may receive an initial configuration of one or more workplaces from the user A 120A. At block 720 the service provider 140 may analyze the configuration and determine a behavioral initiative which may reduce the carbon output of the configuration. The service provider 140 may determine the behavioral initiatives by identifying historical or expert data that describes the optimal carbon output of a similarly configured workplace. If the initial configuration is not running at the minimal carbon output level, the service provider 140 may recommend one or more behavioral initiatives. Some examples of behavioral initiatives may include a power management initiative, a telecommute initiative, and a two-sided printing initiative.

The power management initiative may request the employees at the workspace to take the action of setting their equipment to automatically enter low-power states when not in use, such as a hibernate state for laptops or an auto-off state for monitors. The power management initiative may reduce the number of hours the equipment is running at the typical wattage and may increase the number of hours the equipment is running at the idle wattage, thereby reducing the carbon output of the equipment. The telecommute initiative may request the employees at the workspace to take the action of telecommuting from a home office for one or more days per week. The telecommute initiative may require that the organization purchase equipment for enabling telecommuting from a home office. The telecommute initiative may reduce the amount of office space needed for the workplace. For example, five employees may share four offices, with each employee being assigned a different day of the week to work from home. Alternatively or in addition the telecommute initiative may reduce the carbon emissions generated by employees driving to and from the workplace. The two-sided printing initiative may require that the employees take the action of printing on both sides of a piece of paper. The two-sided initiative may reduce the power consumption of the prints and may reduce the amount of paper consumed by the workplace.

Alternatively or in addition the service provider 140 may provide all of the behavioral initiatives to the user A 120A and may allow the user A 120A to select the behavioral initiatives to implement. The user A 120A may be able to forecast the effects of the behavioral initiatives before deciding which initiatives to implement. The user A 120A may also be able to enter a percentage of employees that they believe may take part in the behavioral initiative. The service provider 140 may apply the percentage to the equipment types associated with the initiative, such as printers, monitors, and laptops, since the service provider 140 may assume that each employee has at least one piece of equipment associated with them. Once a behavioral initiative has been determined the system 100 may move to block 730.

At block 730 the service provider 140 may notify the workers at the workspace of the action required by the behavioral initiative. The service provider 140 may notify the workers by sending the workers an email. Alternatively or in addition, the service provider 140 may generate an email and send the email to the user A 120A. The user A 120A may then forward the email to the workers associated with the initiative. After the workers have been notified of the action required by the initiative, the system 100 may move to block 735. Alternatively or in addition the service provider 140 may exclude a worker from the behavioral initiative if the worker's energy consumption is already at the level expected by the behavioral initiative.

At block 735 the system 100 may identify the first worker in the workplace in order to determine whether the worker has performed the required action. At block 740 the service provider 140 may determine if the worker performed the action required by the behavioral initiative. The service provider 140 may determine whether the worker performed the action by comparing the worker's energy consumption before being notified of the action with the worker's energy consumption after being notified of the action. The service provider 140 may obtain the energy consumption of each worker through energy meters connected to the equipment of the worker, or through the power monitoring system 350. For example, if the behavioral initiative is expected to reduce the energy consumption of each employee by 100 watts per week, the service provider 140 may determine whether the worker's energy consumption has decreased 100 watts (within a reasonable variant, such as 10 watts) in the week following the notification. Alternatively or in addition monitoring software may be used to allow the system to monitor the actions of the user A 120A. For example, the system 100 may poll the desktop of the user A 120A to determine whether the user A 120A left the desktop on or not. Alternatively or in addition the user A 120A may provide an indication to the service provider 140 as to whether the worker performed the action. Alternatively or in addition the user A 120A may manually enter energy use values for the worker before and after being notified of the action.

If, at block 740, the service provider 140 determines the worker performed the action, the system 100 may move to block 750. At block 750 the service provider 140 may provide an incentive to the employee, such as a gift certificate, or generally any incentive capable of inducing the workers to perform the action. If, at block 740, the worker did not perform the action, the system 100 may move to block 760. At block 760 the service provider 140 may re-notify the worker of the action required by the initiative. At block 755 the system 100 may determine whether there are additional workers in the workplace to evaluate. If there are additional workers the system 100 may move to block 765. At block 765 the service provider 140 may identify the next worker in the workplace to evaluate.

If, at block 755, the service provider 140 determines that there are no additional workers to evaluate, the system 100 may move to block 770. At block 770 the service provider 140 may generate a report indicating whether each worker performed the action required by the initiative. At block 780 the service provider 140 may provide the report to the user A 120A, such as through a web interface.

Figure 8:
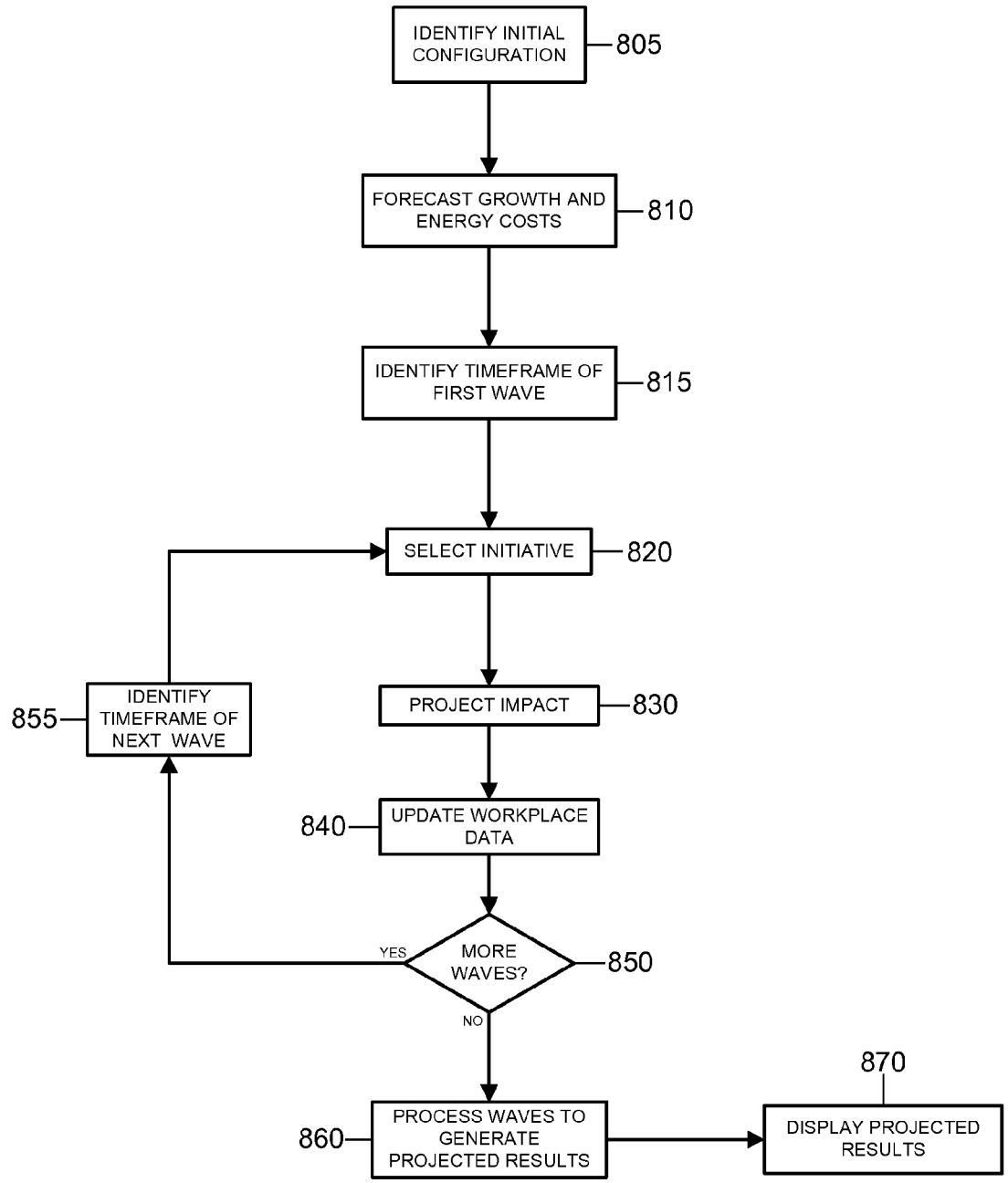
FIG. 8 is a flowchart illustrating the operations of processing multiple implementation waves in the system of FIG. 1, or other systems for providing strategies to reduce the carbon output and operating costs of a workplace.

FIG. 8 is a flowchart illustrating the operations of processing multiple implementation waves in the system of FIG. 1, or other systems for providing strategies to reduce the carbon output and operating costs of a workplace. The user A 120A may use multiple implementation waves to forecast the cumulative effects of multiple initiatives applied to a workplace in serial or in parallel over a period of time. At block 805 the user A 120A may identify the initial configuration and profile of a workplace. The configuration may be a general description using average values to describe the equipment, or a detailed description capturing the actual values of the particular equipment used in the workplace. The profile of the workplace may include the location of the workplace, the number of employees working in the workplace, the air travel data of the workplace, the industry the workplace participates in, or generally any data that might affect the energy consumption of the workplace. Alternatively or in addition the user A 120A may provide a data file, such as a MICROSOFT EXCEL file, an extensible markup language (XML) file, or generally any data file, with the workplace's initial configuration to the system 100. The system 100 may process the file and load the values of the file into the data store 245.

At block 810 the user A 120A may provide an initial energy cost forecast, and tons of carbon generated per kilowatt of energy consumed forecast. The user A 120A may create one or more trends with the one or more sets of forecasted values. The system 100 may display a visual representation of the projected energy costs and carbon emissions of the initial workplace configuration based on the forecasts of the user A 120A.

The system 100 may also provide the user A 120A with expert suggestions for the forecasts, such as expert predictions of the increase in the cost of electricity or expert predictions of the tons of carbon generated per kilowatt hour of energy consumed. The expert predictions may be retrieved from government reports, such as reports including data and analysis conducted by government agencies. Alternatively or in addition the expert predictions may be retrieved from industry experts, such as experts who may provide their predictions for the forecasts which may affect their business. The industry experts may be vendors and/or analysts, such as GARDNER, IDC, and/or FORRESTER. Alternatively or in addition the expert predictions may be retrieved from ACCENTURE experts who may create their own pre-configured projects to make the knowledge available to the users 120A-N.

Alternatively or in addition the user A 120A may be able to view the aggregated forecast, or trend, data across the workplaces of all the other users 120B-N. The user A 120A may be able to filter the results in order to receive a more detailed, customized projection. The aggregate forecast data may be filtered by the geography of the workplace of the users 120B-N, the industry of the users 120B-N, or the expertise of the users 120B-N. The system 100 may also provide the user A 120A with a level of confidence data. The level of confidence data may allow the user A 120A to determine the number of other users 120B-N whose data is represented in the aggregated forecast data. The level of confidence may be reported to the user A 120A by displaying a count per filter combination. The count per filter combination may allow the user A 120A to see the number of other users 120B-N whose data is sourced in the aggregated forecast data. Alternatively or in addition other statistical techniques may be used to provide the user A 120A with confidence levels and/or other measures of potential error. In this case the system 100 may show a range of initiatives on the screen, or an average value with confidence intervals where some percentage of the inputs from the users 120B-N are captured.

At block 815 the user A 120A may identify the timeframe for implementing the workplace technology initiative. The system 100 may use the timeframe to determine the projected energy needs and costs of operating the workplace. At block 820 the user A 120A may select an initiative for the current timeframe of the workplace strategy. The initiative may be a strategy to reduce the operating cost and/or the carbon output of the workplace.

If the user A 120A selects more than one initiative the system 100 may suggest an order in which the initiatives maybe implemented. The order may be optimized relative to the forecasts for the energy costs and the carbon emissions per kWh, or other factors. A method for determining the optimum order may be to compute the reductions achievable for all possible arrangements and provide the order capable of achieving the greatest reduction to the user A 120A. The number of initiatives may be in the hundreds and such a method should be feasible.

At block 830 the system 100 may project the impact of implementing the selected initiative to the workplace. The projection may account for all forecasted values, such as energy costs and the amount of carbon generated per kilowatt of energy consumed. The system 100 may suggest a workplace configuration best suited to implement the selected initiative.

Alternatively or in addition the system 100 may allow the user A 120A to view real-time estimates showing relevant planning metrics as the user A 120A selects initiatives and/or updates their workplace configuration. The metrics may include the energy use in kWh, the carbon footprint, the implementation and operation cost, or generally any metric that may be of interest to the user A 120A.

At block 840 the user A 120A may update the workplace configuration data with the suggested values of the system 100. Alternatively or in addition the user A 120A may disregard the suggestion of the system 100 and insert values determined by their own assessment. At block 850 the user A 120A may identify whether they wish to plan more waves of workplace planning strategies. If, at block 850, the user A 120A wishes to plan out another wave, the system 100 moves to block 855, otherwise the system 100 moves to block 860. At block 855 the user A 120A may identify the timeframe of the next wave and then the system 100 may move to block 820.

At block 860 the system 100 may process all the waves created by the user A 120A to generate the projected aggregate results of the waves on the carbon emissions, electricity cost, operating cost, and energy use of the workplace. The system 100 may generate one or more graphs showing the projected values of these values over the course of the planned timeframe.

If the user A 120A has identified multiple initiatives per wave and an order of the initiatives within the waves, the system 100 may provide a schedule of planned implementation dates of the wave plans. Alternatively or in addition the user A 120A may manually specify the timing of the wave deployment. The schedule may be optimized relative to the forecasts for electricity cost, carbon emissions per kWh, or other factors. The order of deployment may also be optimized based on operational expenses, capital expenses, or other measures. For example, to minimize capital expenditures ("CAPEX"), the system 100 may suggest timing of initiatives in a manner that leverages the savings garnered from the previous waves to finance the cost of later waves. This may require the forecasted cost of the electricity as an input. Alternatively or in addition, to lower operational expenditure ("OPEX") constraint to an annual budget, the system 100 may suggest a timing of initiatives to coincide with changes in energy prices.

At block 870 the service provider 140 may display the graphs and projected results to the user A 120A. The service provider 140 may also provide the user A 120A with a rating and assessment of their workplace strategy. The rating may be based on the strategies and reduction values of the other users 120B-N.

Alternatively or in addition the system 100 may allow the user A 120A to create multiple workplace instances, or multiple profiles, for the same workplace. The multiple workplace instances may allow the user A 120A to compare the effects of different initiatives and/or forecasts on a workplace. For each workplace instance the user A 120A may specify separate headcounts, initiatives, waves, or generally any data associated with the workplaces.

The user A 120A may be able to manage the strategy planning across multiple workplaces so as to ensure that the entire organizational workplace strategy is optimized. The system 100 may allow the user A 120A to view the current or initial configuration of the workplaces, as well as view the projections of their planned changes across all of the workplaces. The information may be used to support other business activities and/or decisions of the user A 120A.

Figure 9:
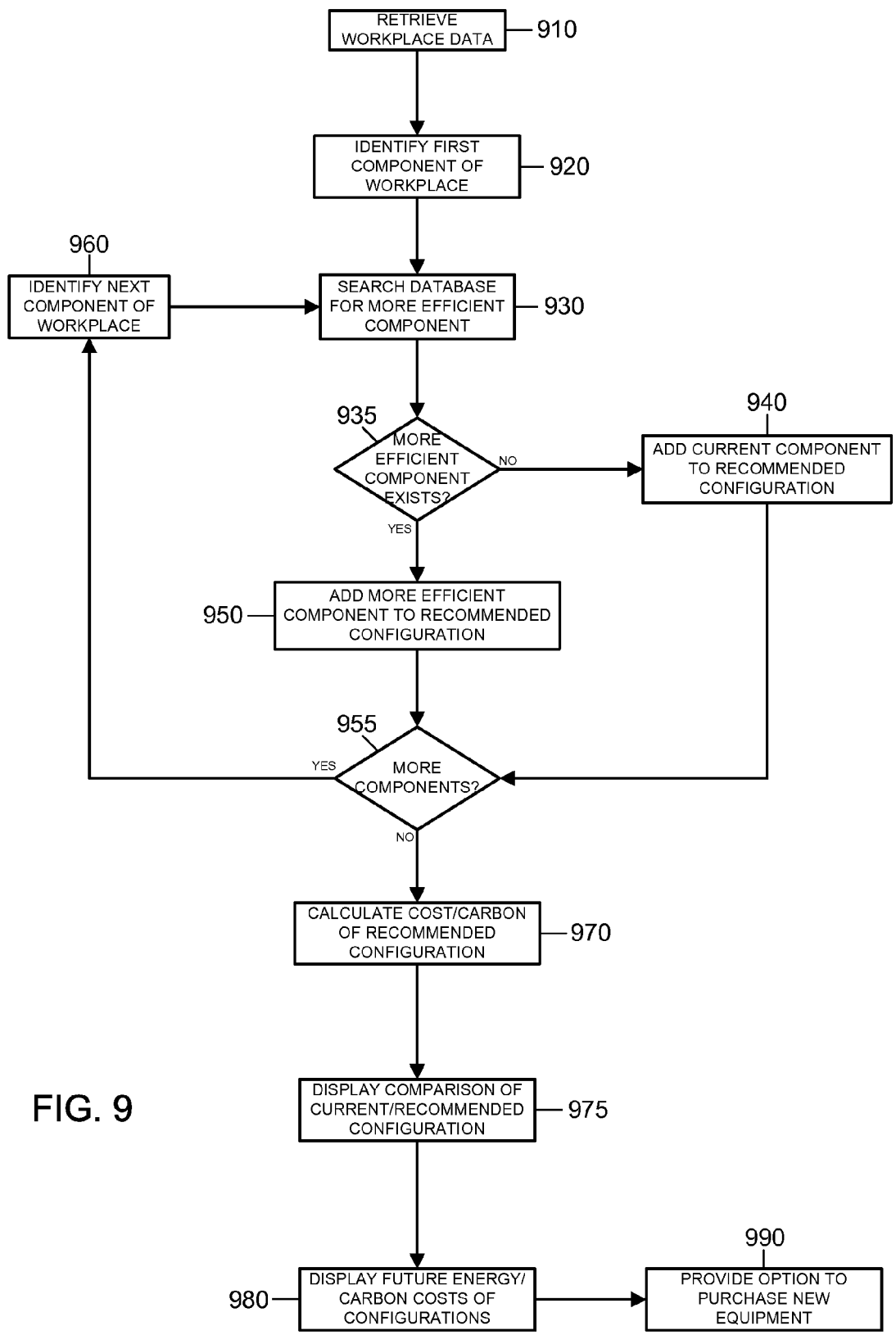
FIG. 9 is a flowchart illustrating the operations of recommending an energy efficient workplace technology configuration in the system of FIG. 1, or other systems for providing strategies to reduce the carbon output and operating costs of a workplace.

FIG. 9 is a flowchart illustrating the operations of recommending an energy efficient workplace technology configuration in the system of FIG. 1, or other systems for providing strategies to reduce the carbon output and operating costs of a workplace. At block 910 the system 100 may retrieve the workplace configuration data of the user A 120A. The configuration data may include the initial and/or current equipment inventory of the user A 120A. The inventory data may include specific make and model numbers of the equipment used in the workplace.

At block 920 the system 100 may identify the first component of the workplace, such as a monitor. At block 930 the service provider 140 may search the historical dataset for a component that is more efficient, either cost-wise or carbon emissions-wise, than the component currently used in the workplace. For example, the service provider 140 may identify a monitor that is more energy efficient than the monitor used in the workplace. Alternatively or in addition the service provider 140 may attempt to convert multiple components into more efficient components, such as converting laptop and desktop computers to a thin client infrastructure. At block 935 the service provider 140 may determine whether a more efficient component exists, capable of replacing one or more components in the current configuration.

If, at block 935, the service provider 140 determines that a more efficient component exists, the system 100 may move to block 950. At block 950 the service provider 140 may add the more efficient component to a recommended configuration. If, at block 935, the service provider 140 determines that a more efficient component does not exist, then the system 100 may move to block 940. At block 940 the service provider 140 may add the current component to the recommended configuration. At block 955 the service provider 140 may determine whether there are additional components to analyze in the workplace inventory. If, at block 955, the service provider 140 determines there are additional components to analyze then the system 100 may move to block 960. At block 960 the service provider 140 may identify the next component to analyze and may repeat the steps of determining whether a more efficient component exists.

After analyzing each of the components in the workplace inventory, and generating a recommended configuration, the system 100 may move to block 970. At block 970 the system 100 may determine the cost of the recommended configuration and the carbon output of the recommended configuration. If the recommended configuration is identical to the initial configuration of the user A 120A then the service provider 140 may report to the user A 120A that there are no optimizations to their workplace configuration.

At block 970 the service provider 140 may display a comparison of the current configuration and the recommended configuration to the user A 120A. The comparison may display to the user A 120A the annual costs and the annual carbon emissions achieved by the current workplace configuration of the user A 120A and those achieved by the recommended configuration. At block 980 the service provider 140 may display a forecast of the future energy and cost savings achievable by the recommended configuration over the initial configuration of the user A 120A. At block 990 the system 100 may offer the user A 120A the option to purchase the equipment necessary to convert the technology in their workplace to the recommended configuration. The service provider 140 may sell the equipment directly to the user A 120A or the service provider 140 may refer the user A 120A to a retailer. If the service provider 140 refers the user A 120A to a retailer the service provider 140 may receive a referral fee or a percentage of any purchases made by the user A 120A.

Figure 10:
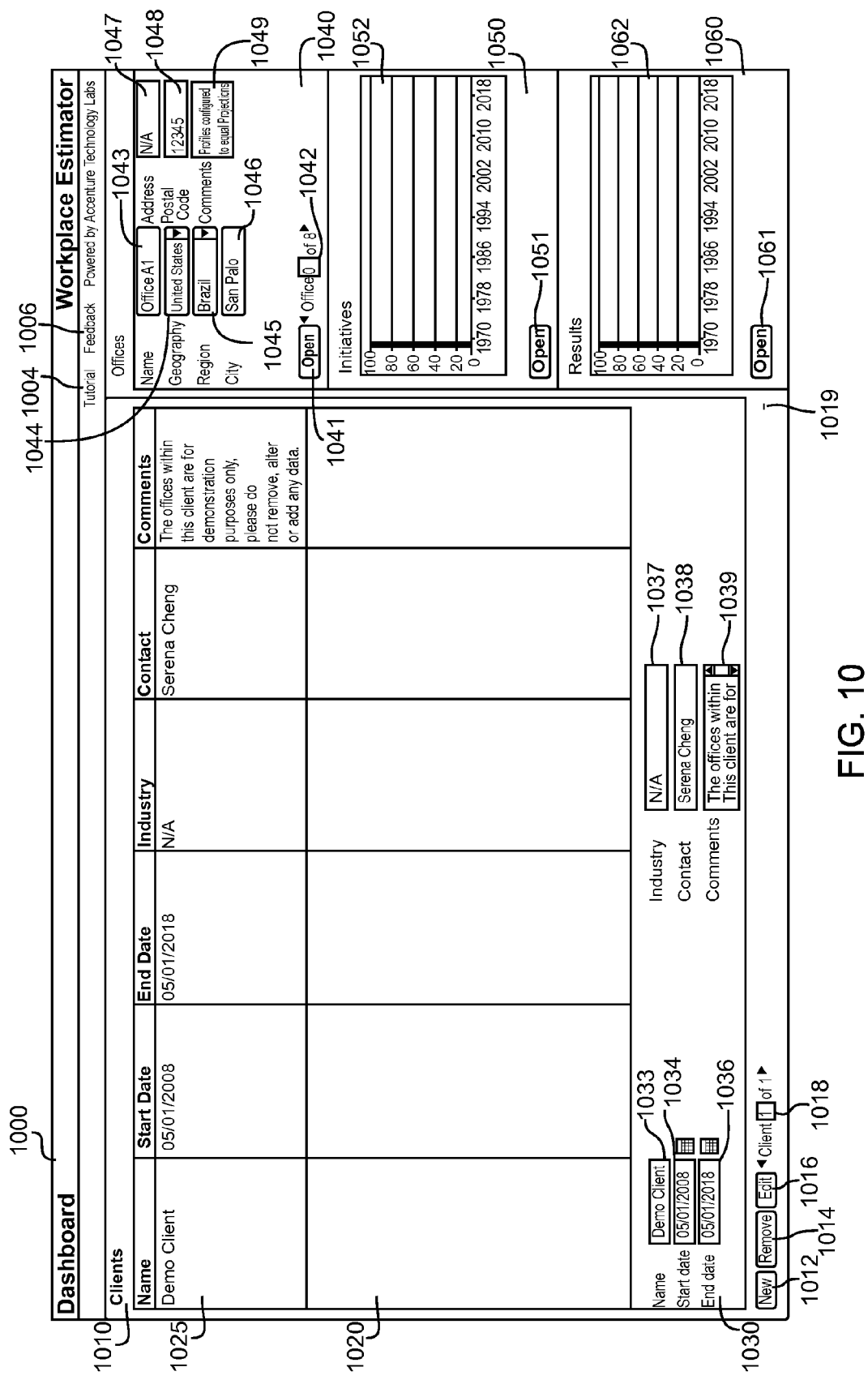
FIG. 10 is a screenshot of a user interface for managing multiple clients in the system of FIG. 1, or other systems for providing strategies to reduce the carbon output and operating costs of a workplace.

FIG. 10 is a screenshot 1000 of a user interface for managing multiple clients in the system of FIG. 1, or other systems for providing strategies to reduce the carbon output and operating costs of a workplace. The screenshot 1000 may be displayed to an administrator 110, such as a consultant, when first interacting with the service provider 140. Alternatively or in addition the screenshot 1000 may be displayed to the user A 120A. The screenshot 1000 may include a tutorial link 1004, a feedback link 1006, a clients subsection 1010, an office data subsection 1040, an initiatives subsection 1050, and a results subsection 1060. The clients subsection 1010 may include a new client button 1012, a remove client button 1014, an edit client button 1016, client selectors 1018, a minimize button 1019, a clients table 1020, and a client data subsection 1030. The client table 1020 may include a selected client 1025. The client data subsection 1030 may include a client name field 1033, a start date field 1034, an end date field 1036, an industry field 1037, a contact field 1038, and a comments field 1039. The offices subsection 1040 may include an office open button 1041, office selectors 1042, an office name field 1043, a geography selector 1044, a region selector 1045, a city field 1046, an address field 1047, a postal code field 1048, and a comments field 1049. The initiatives subsection 1050 may include an initiatives open button 1051, and an initiatives graph 1052. The results subsection 1060 may include a results open button 1061 and a results graph 1062.

In operation, an administrator 110, such as a consultant, may view all of the clients, or organizations, configured with the system 100 in the clients table 1020. The administrator 110 may select a client from the client table 1020, which is then referred to as the selected client 1025. The description data associated with the selected client 1025 may be displayed in the client data subsection 1030. The administrator 110 may be able to view and/or modify the client name of the selected client 1025 in the client name field 1033. The administrator 110 may be able to view and/or modify the start date associated with the selected client 1025 in the start date field 1034. The administrator 110 may be able to view and/or modify the end date associated with the selected client 1025 in the end date field 1036. The start date and the end date may indicate the timeframe in which results will be calculated in. Workplaces profiles and trends may only be created within this timeframe. The administrator 110 may change and/or modify the industry associated with the selected client 1025 in the industry field 1037. The administrator 110 may view and/or modify the contact associated with the selected client 1025 in the contact field 1038. The administrator 110 may view and/or modify the comments associated with the selected client 1025 in the comments field 1039. The administrator 110 may add a new client by clicking on the new client button 1012, may remove the selected client 1025 by clicking on the remove client button 1014, or may edit the selected client 1025 by clicking on the edit client button 1016. The administrator 110 may use the new client button 1012 to create a copy of the current client and configure the copied client with different initiatives than the original client. The administrator 110 may change the selected client 1025 by clicking on the client selectors 1018. The administrator 110 may use a tutorial by clicking on the tutorial link 1004, and may provide feedback by clicking on the feedback link 1006. The administrator 110 may minimize the client subsection 1010 by clicking on the minimize button 1019.

The administrator 110 may view and/or modify each office, or workplace, associated with the selected client 1025 in the office data subsection 1040. The administrator 110 may change the currently viewed office by using the office selectors 1042. The administrator 110 may view or modify the name of the currently viewed office in the office name field 1043. The administrator may view and/or modify the location of the current office using the geography selector 1044. The administrator 110 may view and/or modify the region associated with the office using the region selector 1045. The administrator 110 may view and/or modify the city associated with the office in the city field 1046. The administrator 110 may view and/or modify the address associated with the office in the address field 1047. The administrator 110 may view and/or modify the postal code associated with the office in the postal code field 1048. The administrator 110 may view and/or modify the comments associated with the office in the comments field 1049. The administrator 110 may open a more detailed view of the office listed in the office name field 1043 by clicking on the open office button 1041. The service provider 140 may provide the administrator 110 with the user interface displayed in the screenshot 1100 when the administrator 110 clicks on the open office button 1041.

The administrator 110 may view a graphical output related to any initiatives associated with the office listed in the office name field 1043 of the selected client 1025 in the initiatives graph 1052. The graphical output may be a line graph, a bar graph, a pie chart, or generally any type of graph. The administrator 110 may open a more detailed view of the initiatives by clicking on the open initiatives button 1051. The service provider 140 may provide the administrator 110 with the user interface displayed in the screenshot 1700 when the administrator 110 clicks on the open initiatives button 1051.

The administrator 110 may view a graphical output related to any results associated with the office listed in the office name field 1043 of the selected client 1025 in the results graph 1062. The administrator 110 may open a more detailed view of the results by clicking on the open results button 1061. The service provider 140 may provide the administrator 110 with the user interface displayed in the screenshot 1500 when the administrator 110 clicks on the open results button 1061.

The service provider 140 may provide a user A 120A with a tutorial of the system 100 when the user A 120A clicks on the tutorial link 1004. The user A 120A may be able to submit feedback on the system 100 by clicking on the feedback link 1006.

Figure 11:
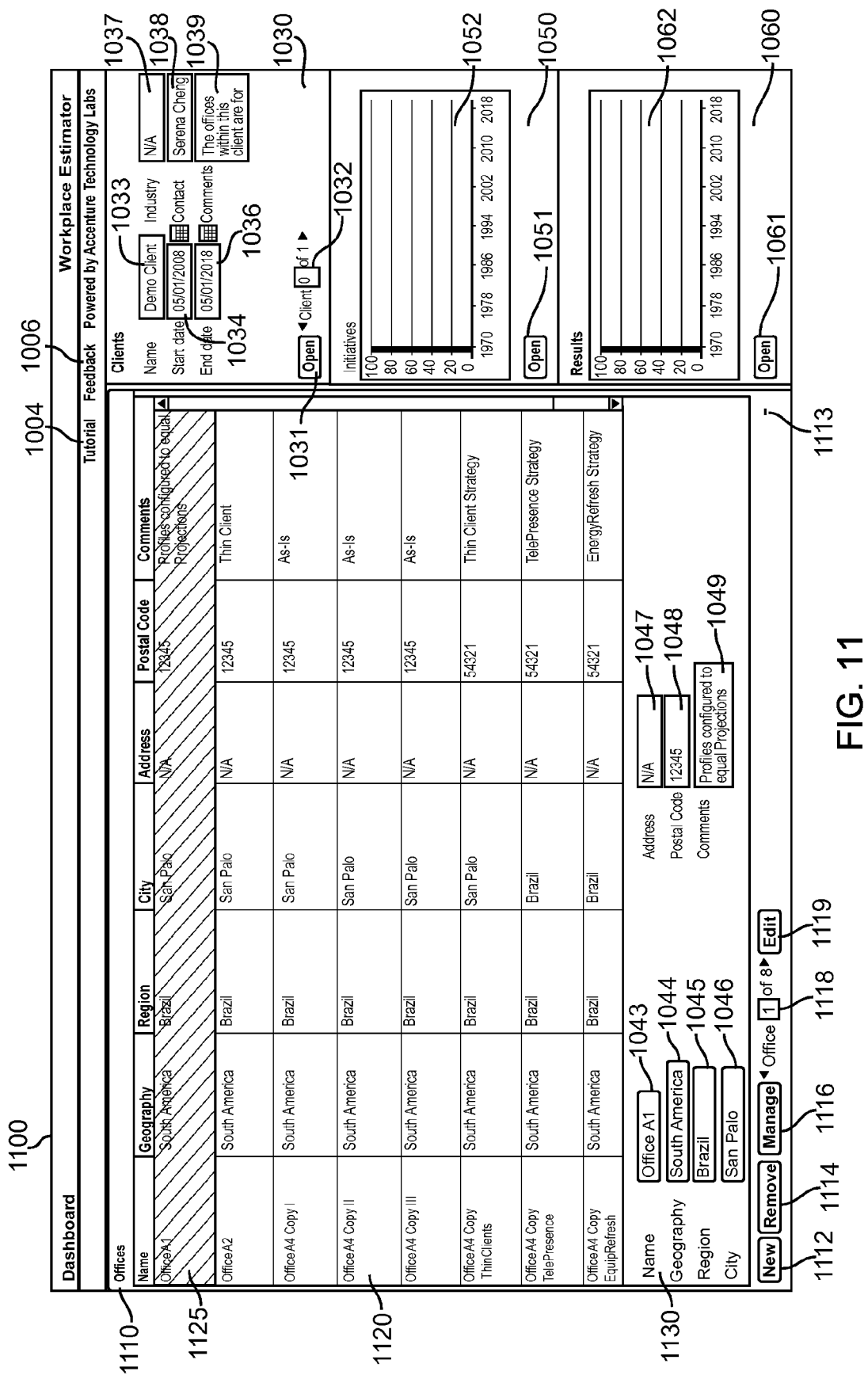
FIG. 11 is a screenshot of a user interface for managing multiple workplaces in the system of FIG. 1, or other systems for providing strategies to reduce the carbon output and operating costs of a workplace.

FIG. 11 is a screenshot 1100 of a user interface for managing multiple workplaces in the system of FIG. 1, or other systems for providing strategies to reduce the carbon output and operating costs of a workplace. The screenshot 1100 may be displayed to the administrator 110 when the administrator 110 clicks on the office open button 1041 in FIG. 10. Alternatively or in addition the user A 120A may be displayed the screenshot 1100 after logging into the system 100. The screenshot 1100 may include a tutorial link 1004, a feedback link 1006, an offices subsection 1110, a client data subsection 1030, an initiatives subsection 1050, and a results subsection 1060. The offices subsection 1110 may include a new office button 1112, a remove office button 1114, a manage office button 1116, office selectors 1118, an edit office button 1119, an offices table 1120, and an office data subsection 1040. The offices table 1120 may include a selected office 1125. The office data subsection 1040 may include an office name field 1043, a geography selector 1044, a region selector 1045, a city field 1046, an address field 1047, a postal code field 1048, and a comments field 1049. The client subsection 1030 may include a client open button 1031, client selectors 1032, a client name field 1033, a start date field 1034, an end date field 1036, an industry field 1037, a contact field 1038, and a comments field 1039. The initiatives subsection 1050 may include an open initiative button 1051, and an initiative graph 1052. The results subsection 1060 includes an open result button 1061, and a results graph 1062.

In operation the user A 120A may view all of the workplaces configured with the system 100 in the office table 1120. The user A 120A may select an office in the office table 1120, which is then referred to as the selected office 1125. The user A 120A may modify and/or view information related to the selected office 1125 in the office data subsection 1030. The user A 120A may create a new office by clicking on the new office button 1112. The user A 120A may remove the selected office 1125 by clicking on the remove office button 1114. The user A 120A may manage the selected office 1125 by clicking on the manage office button 1116. The service provider 140 may provide the user A 120A with the user interface displayed in the screenshot 1200 when the user A 120A clicks on the manage office button 1116. The user A 120A may change the selected office 1125 by using the office selectors 1118. The user A 120A may edit the selected office 1125 by clicking on the edit office button 1119. The user A 120A may minimize the offices subsection 1110 by clicking on the minimize button 1113.

The user A 120A may view and/or modify the client data associated with the client listed in the client name field 1033 in the client data subsection 1030. The administrator 110 may click on the client open button 1031 to view the user interface displayed in the screenshot 1000 and may use the client selectors 1032 to change clients. The client open button 1031 and client selectors 1032 may not be available to the user A 120A.

The user A 120A may view initiative data relating to the selected office 1125 in the initiatives table 1052. The user A 120A may view more detailed information relating to the initiatives associated with the selected office 1125 by clicking on the open initiatives button 1051. The service provider 140 may provide the user A 120A with the user interface displayed in the screenshot 1700 when the user A 120A clicks on the open initiative button 1151.

The user A 120A may view results data relating to the selected office 1125 in the results table 1062. The user A 120A may view more detailed information relating to the results associated with the selected office 1125 by clicking on the open results button 1061. The service provider 140 may provide the user A 120A with the user interface displayed in the screenshot 1500 when the user A 120A clicks on the open results button 1161.

Figure 12:
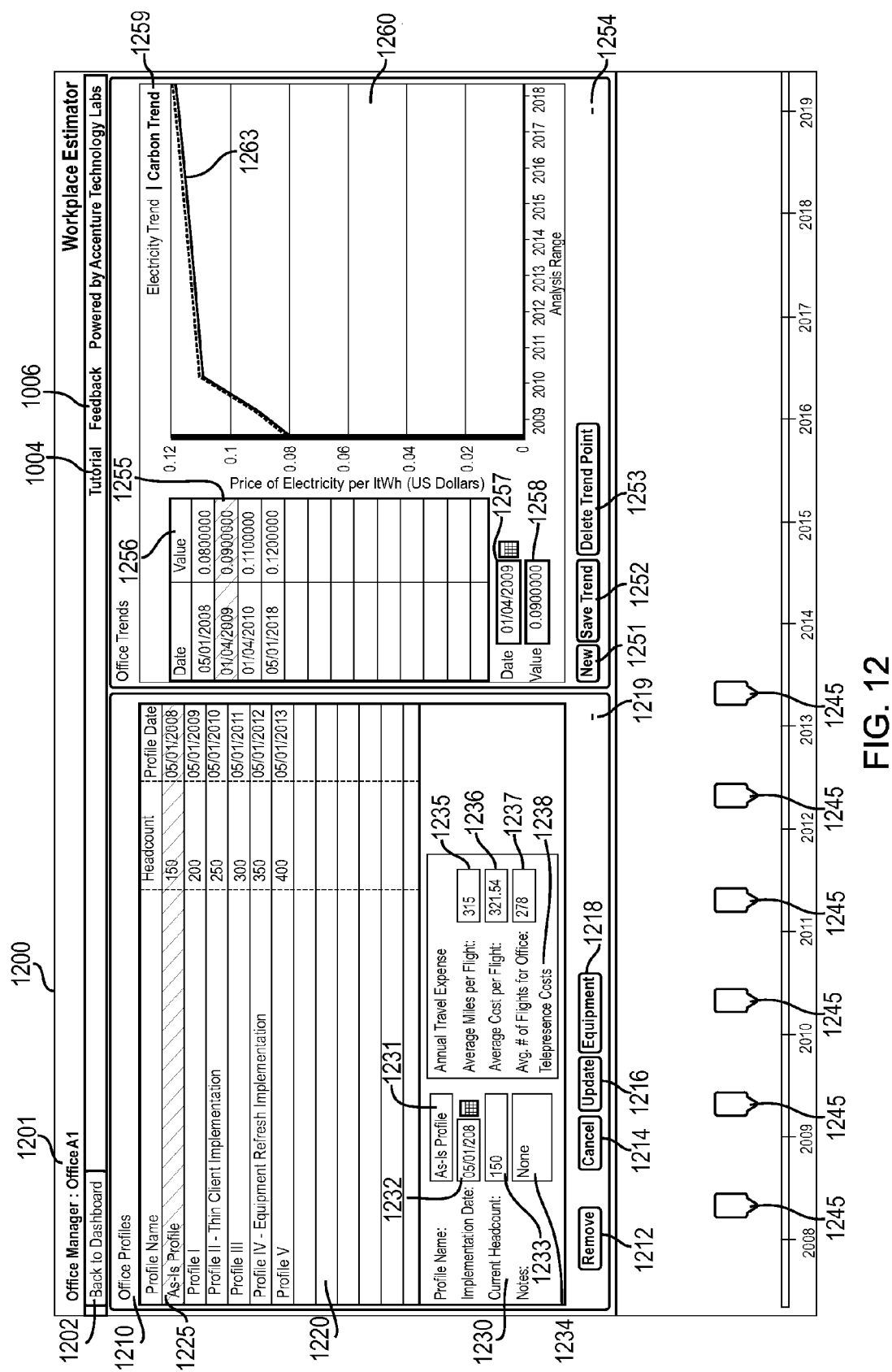
FIG. 12 is a screenshot of a user interface for managing workplace profiles in the system of FIG. 1, or other systems for providing strategies to reduce the carbon output and operating costs of a workplace.

FIG. 12 is a screenshot 1200 of a user interface for managing workplace profiles in the system of FIG. 1, or other systems for providing strategies to reduce the carbon output and operating costs of a workplace. The screenshot 1200 may be displayed to the user A 120A when the user A 120A clicks on the manage office button 1116 in FIG. 11. The screenshot 1200 may include a tutorial link 1004, a feedback link 1006, a selected office display 1201, a back to dashboard button 1202, an office profile subsection 1210, a profile timeline 1240, and a trend subsection 1250. The profile subsection 1210 may include a remove profile button 1212, a cancel profile button 1214, an update profile button 1216, an equipment button 1218, a minimize profile subsection button 1219, a profile table 1220 and a profile data subsection 1230. The profile table 1220 may include a selected profile 1225. The profile data subsection 1230 may include a profile name field 1231, an implementation date field 1232, a current headcount field 1233, a notes field 1234, an average miles per flight field 1235, an average cost per flight field 1236, an average flights for office field 1237, and a telepresence link 1238. The office profile timeline 1240 may include one or more implementation date indicators 1245. The trends subsection 1250 may include a new trend button 1251, a save trend button 1252, a delete trend point button 1253, a minimize trend subsection button 1254, a selected trend 1255, a trend table 1256, a trend date field 1257, a trend value field 1258, a trend type selector 1259, and a trend graph 1260. The trend graph 1260 may include a trend line 1263.

In operation the office being currently managed may be displayed in the selected office display 1201. The user A 120A may maintain one or more profiles for each office listed in the office table 1125 in the screenshot 1100. The user A 120A may return to the user interface displayed in the screenshot 1100 by clicking on the back to dashboard button 1202. The user A 120A may view the profiles associated with the office listed in the office name display 1201 in the profiles table 1220. The user A 120A may select a profile from the profiles table 1220. For example, in the screenshot 1200 the "As-is Profile" may be the selected profile 1225. The user A 120A may remove the selected profile 1225 by clicking on the remove profile button 1212. The user A 120A may cancel the selected profile 1225 by clicking on the cancel profile button 1214. Canceling the selected profile 1225 may cause the selected profile 1225 to become inactive without removing the selected profile from the system 100. The user A 120A may update the selected profile 1225 by clicking on the update profile button 1216. The user A 120A may view and/or modify the equipment associated with the selected profile 1225 by clicking on the equipment button 1218. The service provider 140 may provide the user A 120A with the user interface displayed in screenshot 1400 when the user A 120A clicks on the equipment button 1218.

The user A 120A may view and/or modify data relating to the selected profile 1225 in the profile data subsection 1230. The user A 120A may view and/or modify the name of the selected profile 1225 in the profile name field 1231. The user A 120A may view and/or modify the implementation date of the selected profile 1225 in the implementation date field 1232. The user A 120A may view and/or modify the current headcount of the selected profile 1225 in the current headcount field 1233. The user A 120A may view and/or modify the notes associated with the selected profile 1225 in the notes field 1234. The user A 120A may view and/or modify the average miles per flight associated with the selected profile 1225 in the average miles per flight field 1235. The user A 120A may view and/or modify the average cost per flight associated with the selected profile 1225 in the average cost per flight field 1236. The user A 120A may view and/or modify the average number of flights per office associated with the selected profile 1225 in the average number of flights per office field 1237. The user A 120A may view the telepresence costs associated with the selected profile 1225 by clicking on the telepresence costs link 1238. The service provider 140 may provide the user A 120A with the user interface displayed in the screenshot 1300 when the user A 120A clicks on the telepresence costs link 1238.

The user A 120A may view a graphical representation of the implementation dates of the profiles in the profile timeline 1240. The implementation date indicators 1245 may indicate the implementation start date of each of the profiles listed in the profiles table 1220. The user A 120A may be able to click on an implementation date indicator 1245 and cause the profile associated with the implementation date indicator 1245 to become the selected profile 1225.

The user A 120A may view and/or modify the trend data associated with the selected profile 1225 in the trends subsection 1250. The user A 120A may select a trend in the trend table 1256. For example, in the screenshot 1200, the selected trend 1255, is the trend with a date of "01/04/2009" and a value of "0.0900000." The user A 120A may modify the date associated with the selected trend 1255 in the date field 1257. The user A 120A may modify the value associated with the selected trend in the value field 1258. The user A 120A may add a new trend by clicking on the new trend button 1251. The user A 120A may save the new trend, or a modified trend, by clicking the save trend button 1252. The user A 120A may delete the selected trend 1255 by clicking on the delete trend point button 1253. The user A 120A may switch between electricity trends and carbon trends by clicking on the trend selector 1259. The user A 120A may view the dates and values associated with the trends listed in the trend table 1256 in the trend graph 1260. The trend graph 1260 may display a trend line 1263 relating to the trend values and dates.

Figure 13:
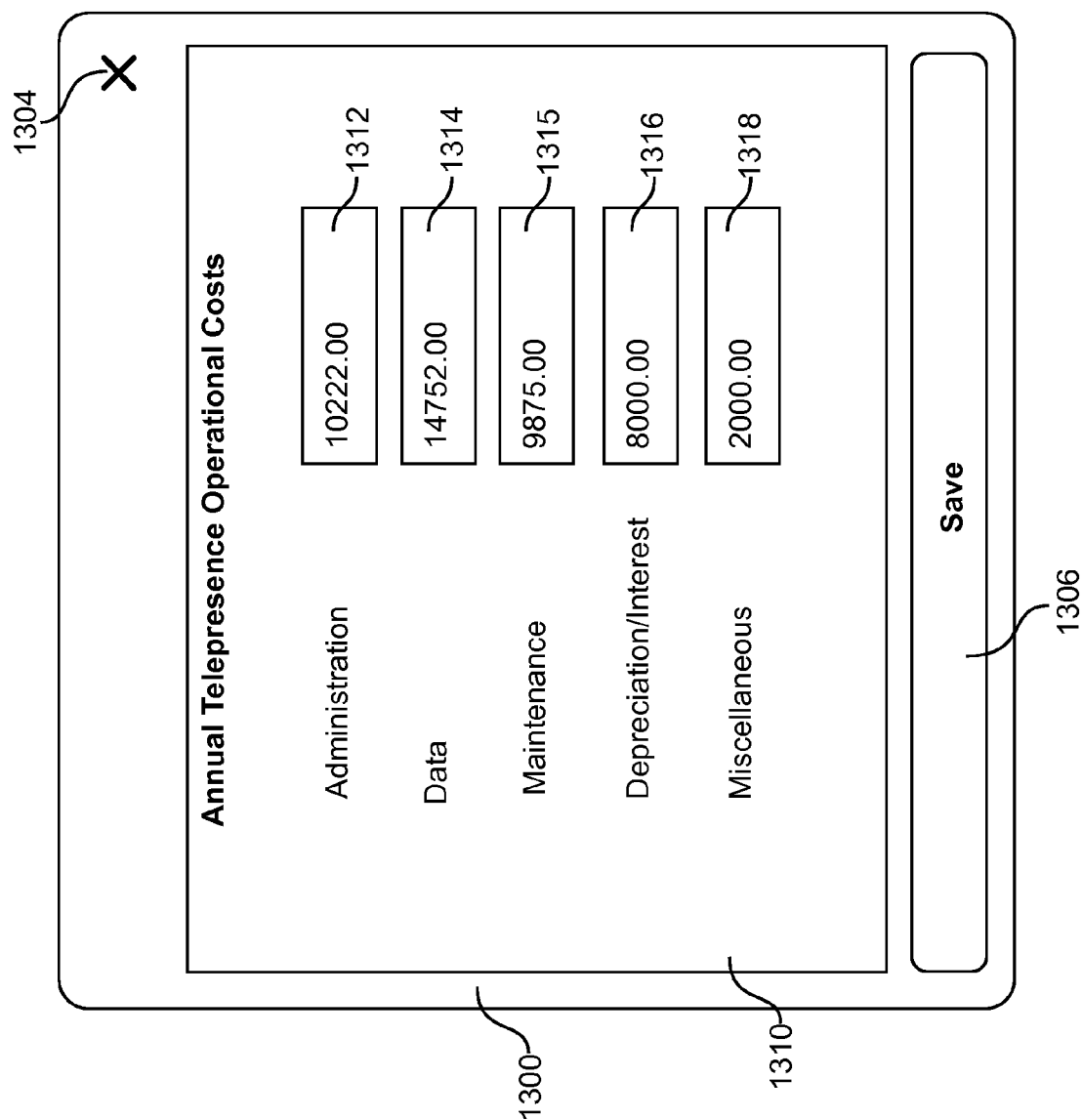
FIG. 13 is a screenshot of a user interface for providing telepresence cost data in the system of FIG. 1, or other systems for providing strategies to reduce the carbon output and operating costs of a workplace.

FIG. 13 is a screenshot 1300 of a user interface for inputting telepresence cost data in the system of FIG. 1, or other systems for providing strategies to reduce the carbon output and operating costs of a workplace. The screenshot 1300 may be displayed to the user A 120A when the user A 120A clicks on the telepresence link 1238 in the FIG. 12. The screenshot 1300 may include a close button 1304, a save button 1306, and a cost subsection 1310. The cost subsection 1310 may include a administration cost field 1312, a data cost field 1314, a maintenance cost field 1315, a depreciation/interest cost field 1316, and a miscellaneous field 1318.

In operation, the user A 120A may update the annual telepresence costs of the selected profile in the cost subsection 1310. The user A 120A may view and/or modify the telepresence administration cost in the administration cost field 1312. The user A 120A may view and/or modify the telepresence data cost in the data cost field 1314. The user A 120A may view and/or modify the telepresence maintenance cost in the maintenance cost field 1315. The user A 120A may view and/or modify the telepresence depreciation/interest cost in the depreciation/interest cost field 1316. The user A 120A may view and/or modify the telepresence miscellaneous costs in the miscellaneous costs field 1318. After the user A 120A modifies the telepresence costs, the user A 120A may click on the save button 1306 to save the changes in the system 100.

Figure 14:
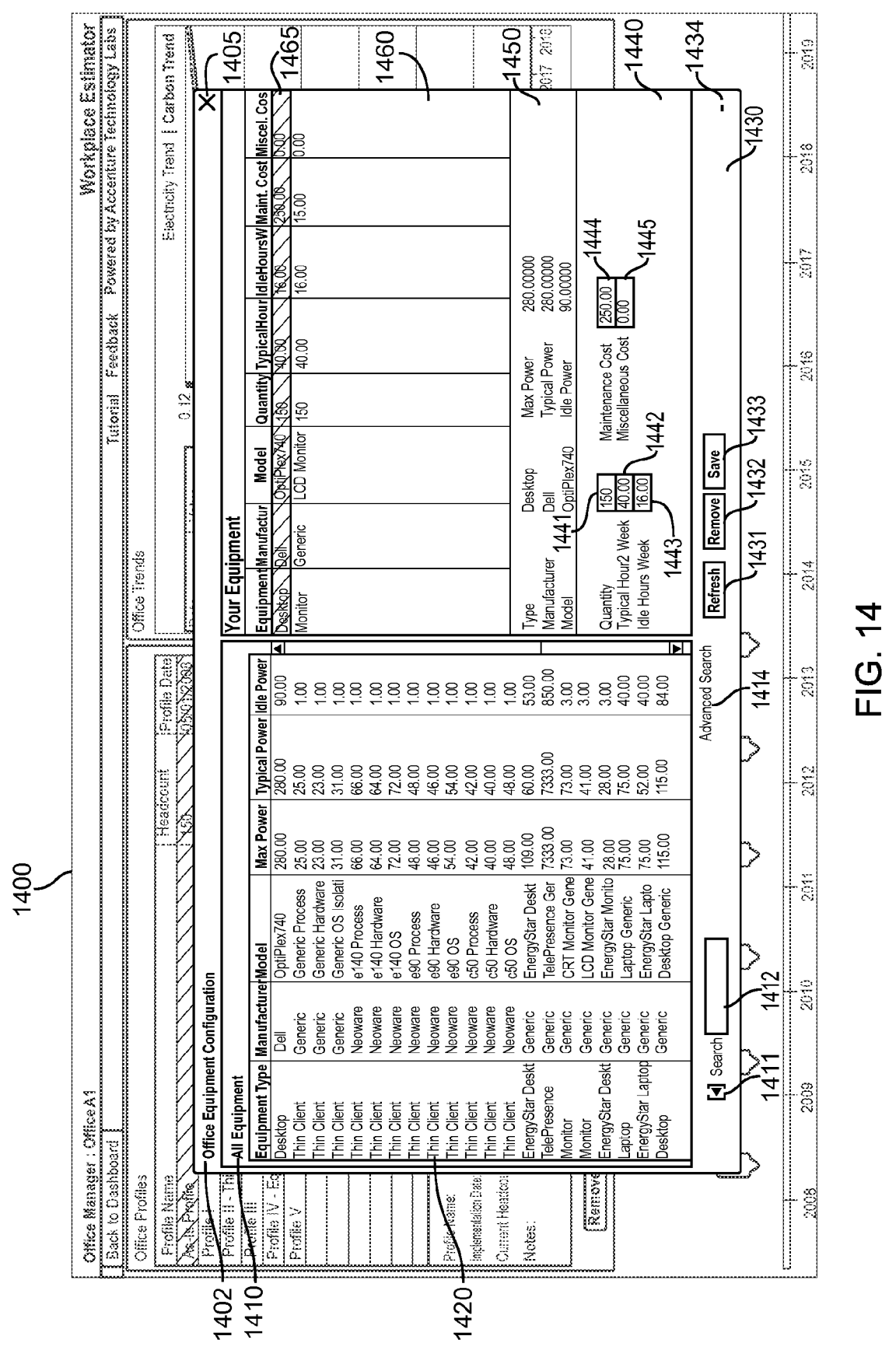

FIG. 14 is a screenshot 1400 of a user interface for inputting detailed technology configuration data in the system of FIG. 1, or other systems for providing strategies to reduce the carbon output and operating costs of a workplace. The screenshot 1400 may be displayed to the user A 120A when the user A 120A clicks on the equipment button 1218 in the screenshot 1200. The screenshot 1400 may include an equipment configuration window 1402, a close window button 1405, a equipment configuration subsection 1410 and a equipment profiles subsection 1430. The equipment configuration subsection 1410 may include an expand button 1411, a search field 1412, an advanced search link 1414, and an equipment table 1420. The equipment profiles subsection 1430 may include a refresh button 1431, a remove button 1432, a save button 1433, a minimize button 1434, a equipment data subsection 1440, a equipment view subsection 1450, and a profile equipment table 1460. The profile equipment values subsection 1440 may include a quantity field 1441, a typical hours per week field 1442, an idle hours per week field 1443, a maintenance cost field 1444, and a miscellaneous cost field 1445. The profile equipment table 1460 may include a selected equipment 1465.

In operation, the user A 120A may view all of the equipment stored in the system 100, such as in the data store 245, in the equipment table 1420. The user A 120A may search the equipment table 1420 in the search field 1412. The user A 120A may expand the equipment table 1420 by clicking on the expand button 1411. The user A 120A may perform an advanced search on the equipment table 1420 by clicking on the advanced search link 1414.

The user A 120A may view and/or modify the equipment associated with the selected profile in the profile equipment table 1460. The user A 120A may view data associated with the selected profile equipment 1465 in the equipment view subsection 1450. The user A 120A may modify values associated with the selected profile equipment 1465 in the profile equipment values subsection 1440. The user A 120A may view and/or modify the quantity of the selected profile equipment 1465 in the quantity field 1441. The user A 120A may view and/or modify the typical hours per week the selected profile equipment 1465 is used in the typical hours per week field 1442. The user A 120A may view and/or modify the idle hours per week of the selected profile equipment 1465 in the idle hours per week field 1443. The user A 120A may view and/or modify the maintenance cost associated with the selected profile equipment 1465 in the maintenance cost field 1444. The user A 120A may view and/or modify the miscellaneous costs associated with the selected profile equipment 1465 in the miscellaneous cost field 1445. The user A 120A may refresh the selected profile equipment 1465 by clicking on the refresh button 1431. The user A 120A may remove the selected profile equipment 1465 by clicking on the remove button 1432. The user A 120A may save changes in the profile equipment values subsection 1430 by clicking on the save button 1433. The user A 120A may minimize the equipment configuration window by clicking on the minimize button 1434.

FIG. 15 is a screenshot 1500 of a user interface for displaying result data in the system of FIG. 1, or other systems for providing strategies to reduce the carbon output and operating costs of a workplace. The screenshot 1500 may be displayed to the user A 120A when the user A 120A clicks on the open results button 1062 in the screenshot 1000. The screenshot 1500 may include a tutorial link 1004, a feedback link 1006, a results subsection 1501, a region comparison selector 1502, a client comparison selector 1503, an electricity use view button 1504, a carbon output view button 1505, a electricity cost view button 1506, an operating cost view button 1507, an assessment view button 1508, a refresh button 1509, an office graph 1520, a client data subsection 1030, an office data subsection 1040, and an initiatives subsection 1050. The results subsection 1502 may include an offices table 1510 and a selected office 1515. The office graph 1520 may include a first office line 1521, a second office line 1522, and a third office line 1523. The client data subsection 1030 may include a client open button 1031, client selectors 1032, a client name field 1033, a start date field 1034, an end date field 1036, an industry field 1037, a contact field 1038, and a comments field 1039. The offices subsection 1040 may include an office open button 1041, office selectors 1042, an office name field 1043, a geography selector 1044, a region selector 1045, a city field 1046, an address field 1047, a postal code field 1048, and a comments field 1049. The initiatives subsection 1050 may include an initiatives open button 1051, and an initiatives graph 1052.

In operation, the user A 120A may select an office in the offices table 1510. For example, in the screenshot 1500, the selected office 1515 may be the "Office A1." The user A 120A may select one or more results checkboxes 1514, projection checkboxes 1516, and reduction checkboxes 1518 for the offices displayed in the offices table 1510. The user A 120A may click on the region comparison button 1502 to view data at a region level. The user A 120A may click on the client comparison button 1503 to view data at a client level. The client comparison button 1503 may not be available to the user A 120A, only to the administrator 110.

The user A 120A may view the values associated with the selected checkboxes 1514, 1516, 1518, in the office graph 1520. The office graph 1520 may display a line for each of the checkboxes 1514, 1516, 1518 selected, such as the first office line 1521, the second office line 1522, and the third office line 1523. Alternatively or in addition the office graph 1520 may include a reduction line which may demonstrate the difference between the projected results and the initial results.

The user A 120A may view the description data associated with the organization in the client data subsection 1030. The user A 120A may be able to view and/or modify the client name of the selected client 1025 in the client name field 1033. The user A 120A may be able to view and/or modify the start date associated with the selected client 1025 in the start date field 1034. The user A 120A may be able to view and/or modify the end date associated with the selected client 1025 in the end date field 1036. The user A 120A may change and/or modify the industry associated with the selected client 1025 in the industry field 1037. The user A 120A may view and/or modify the contact associated with the selected client 1025 in the contact field 1038. The user A 120A may view and/or modify the comments associated with the selected client 1025 in the comments field 1039. The user A 120A may open a more detailed view of the client data subsection 1030 by clicking on the client open button 1031. The service provider 140 may provide the user A 120A with the user interface displayed in the screenshot 1000 when the user A 120A clicks on the client open button 1031. Alternatively or in addition only the administrator 110 may be allowed to click on the client open button 1031. The administrator 110 may change the displayed client by clicking on the client selectors 1032. The user A 120A may not have access to the client selectors 1032.

The user A 120A may view and/or modify each office, or workplace, associated with the organization in the office data subsection 1040. The user A 120A may change the currently viewed office by using the office selectors 1042. The user A 120A may view or modify the name of the currently viewed office in the office name field 1043. The user A 120A may view and/or modify the location of the current office using the geography selector 1044. The user A 120A may view and/or modify the region associated with the office using the region selector 1045. The user A 120A may view and/or modify the city associated with the office in the city field 1046. The user A 120A may view and/or modify the address associated with the office in the address field 1047. The user A 120A may view and/or modify the postal code associated with the office in the postal code field 1048. The user A 120A may view and/or modify the comments associated with the office in the comments field 1049. The user A 120A may open a more detailed view of the office listed in the office name field 1043 by clicking on the open office button 1041. The service provider 140 may provide the user A 120A with the user interface displayed in the screenshot 1100 when the user A 120A clicks on the open office button 1041.

The user A 120A may view data relating to the initiatives associated with the selected office 1515 in the initiatives subsection 1050. The user A 120A may view graphical data associated with the initiatives in the initiative graph 1052. The user A 120A may open a more detailed view of the initiatives by clicking on the open initiatives button 1051. The service provider 140 may provide the user A 120A with the user interface displayed in the screenshot 1700 when the user A 120A clicks on the open initiatives button 1051.

FIG. 16 is a screenshot 1600 of a user interface for displaying assessment data in the system of FIG. 1, or other systems for providing strategies to reduce the carbon output and operating costs of a workplace. The screenshot 1600 may be displayed to the user A 120A when the user A 120A clicks on the assessment view button 1508 in the screenshot 1500. The screenshot 1600 may include an export to PDF button 1604, an export to excel button 1608, an assessment subsection 1610, and an environmental comparisons subsection 1620.

In operation the user A 120A may view assessment information for their organization in the assessment subsection 1610. The assessment information may include the total electricity cost reduction, the total operating cost reduction, the total carbon output reduction and the total travel cost reduction. The user A 120A may view environmental comparison data in the environmental comparison subsection 1620. The environmental comparison data may include the number of cars that may be removed from the road as a result of the carbon output reduction and the number of acres of forest that may be planted as a result of the carbon output reduction. The user A 120A may export the data to an ADOBE ACROBAT PDF file by clicking on the export to PDF button 1604, or may export the data to a MICROSOFT EXCEL spreadsheet by clicking on the export to excel button 1608.

FIG. 17 is a screenshot 1700 of a user interface for forecasting the effects of initiatives in the system of FIG. 1, or other systems for providing strategies to reduce the carbon output and operating costs of a workplace. The screenshot 1700 may be displayed to the user A 120A when the user A 120A clicks on the open initiatives button 1051 in the screenshot 1000. The screenshot 1700 may include a tutorial link 1004, a feedback link 1006, an initiatives subsection 1710, a client data subsection 1030, an office data subsection 1040, and a results subsection 1060. The initiative subsection 1710 may include an electricity use button 1712, a carbon output button 1714, an electricity cost button 1716, an operating cost button 1718, an initiative table 1720, an initiative data subsection 1730, and an initiative graph 1740. The initiative table 1720 may include a selected office 1725, telepresence checkboxes 1721, thin client checkboxes 1722, thin client reduction fields 1723, equipment refresh checkboxes 1726 and equipment refresh reduction fields 1727. The initiative data subsection 1730 may include a thin clients tab 1732, a telepresence tab 1734 and an equipment refresh tab 1736. The initiatives graph 1740 may include a first initiative line 1741, a second initiative line 1742, a third initiative line 1743, and a fourth initiative line 1744. The client data subsection 1030 may include a client open button 1031, client selectors 1032, a client name field 1033, a start date field 1034, an end date field 1036, an industry field 1037, a contact field 1038, and a comments field 1039. The offices subsection 1040 may include an office open button 1041, office selectors 1042, an office name field 1043, a geography selector 1044, a region selector 1045, a city field 1046, an address field 1047, a postal code field 1048, and a comments field 1049. The results subsection 1060 may include a results open button 1061, and a results graph 1052.

In operation the user A 120A may select one or more initiatives associated with the offices in the initiatives table 1720. Graphical results relating to the selected initiatives and offices may be displayed in the initiatives graph 1740. Each office may be represented by a separate row in the initiatives table 1720. For each office the user A 120A may select one or more of the telepresence checkbox 1721, the thin client checkbox 1722, and the equipment refresh checkbox 1726. If the user A 120A selects the thin client checkbox 1722 and/or the equipment refresh checkbox 1726, the user A 120A may also provide a thin client reduction factor in the thin client reduction field 1723, and/or an equipment refresh reduction factor, in the equipment refresh reduction field 1727. The reduction factors may represent the percentage of the current equipment to be affected by the forecast. The user A 120A may view the detailed values associated with each of the initiatives in the initiative subsection 1730. The user A 120A may view the thin client values by clicking on the thin client tab 1732, the telepresence values by clicking on the telepresence tab 1734, and the equipment refresh values by clicking on the equipment refresh tab 1736.

If the user A 120A clicks on the telepresence checkbox 1721 the service provider 130 may add telepresence equipment to each of the profiles associated with the workplace and may reduce the travel expenses for each of the profiles. If the user A 120A clicks on a thin client checkbox 1722 the service provider 130 may replace the percentage of desktops and/or laptops identified in the thin client reduction field 1723 with generic thin client equipment. If the user A 120A clicks on a equipment refresh checkbox 1726 the service provider 130 may replace the percentage of desktops, laptops and/or monitors identified in the equipment refresh reduction field 1727 with generic ENERGY STAR equipment, including operating costs.

The user A 120A may click on one of the buttons 1712, 1714, 1716, 1718 to generate the results of their initiative table 1720 selections in the initiative graph 1740. The electricity use button 1712 may display the graph forecasts relative to the electricity costs, the carbon output button 1714 may display the graph forecasts relative to the carbon output, the electricity cost button 1716 may display the graph forecasts relative to the electricity cost, and the operating cost button 1718 may display the graph forecasts relative to the operating costs.

The forecasts may be displayed to the user A 120A in graphical form in the initiative graph 1740. The initiative graph may have display lines 1741, 1742, 1743, 1744 corresponding to both the initiative configuration forecast and the current configuration forecast for each office to which an initiative is applied in the initiatives table 1720. The graph 1740 may provide the user A 120A with an estimate of the effects of the initiatives as compared to the current configuration of their offices.

The user A 120A may view the description data associated with the organization of the user A 120A in the client data subsection 1030. The user A 120A may be able to view and/or modify the client name of the client associated with the selected office 1725 in the initiatives table 1720. The user A 120A may be able to view and/or modify the start date associated with the client associated with the selected office 1725 in the start date field 1034. The user A 120A may be able to view and/or modify the end date associated with the client associated with the selected office 1725 in the end date field 1036. The user A 120A may change and/or modify the industry associated with the client associated with the selected office 1725 in the industry field 1037. The user A 120A may view and/or modify the contact associated with the client associated with the selected office 1725 in the contact field 1038. The user A 120A may view and/or modify the comments associated with the client associated with the selected office 1725 in the comments field 1039. The user A 120A may open a more detailed view of the client data subsection 1030 by clicking on the client open button 1031. The service provider 140 may provide the user A 120A with the user interface displayed in the screenshot 1000 when the user A 120A clicks on the client open button 1031. Alternatively or in addition only the administrator 110 may be allowed to click on the client open button 1031. The administrator 110 may change the displayed client by clicking on the client selectors 1032. The user A 120A may not have access to the client selectors 1032.

The user A 120A may view and/or modify data describing the selected office 1725 in the office data subsection 1040. The user A 120A may change the selected office 1725 by using the office selectors 1042. The user A 120A may view or modify the name of the currently viewed office in the office name field 1043. The user A 120A may view and/or modify the location of the selected office 1725 using the geography selector 1044. The user A 120A may view and/or modify the region associated with the selected office 1725 using the region selector 1045. The user A 120A may view and/or modify the city associated with the selected office 1725 in the city field 1046. The user A 120A may view and/or modify the address associated with the selected office 1725 in the address field 1047. The user A 120A may view and/or modify the postal code associated with the selected office 1725 in the postal code field 1048. The user A 120A may view and/or modify the comments associated with the selected office 1725 in the comments field 1049. The user A 120A may open a more detailed view of the selected office 1725 listed in the office name field 1043 by clicking on the open office button 1041. The service provider 140 may provide the user A 120A with the user interface displayed in the screenshot 1100 when the user A 120A clicks on the open office button 1041.

The user A 120A may view results data relating to the selected office 1725 in the results table 1062. The user A 120A may view more detailed information relating to the results associated with the selected office 1725 by clicking on the open results button 1061. The service provider 140 may provide the user A 120A with the user interface displayed in the screenshot 1500 when the user A 120A clicks on the open results button 1161.

FIG. 18 is a set of data tables displaying exemplary values associated with generic office equipment used for forecasting the effects of initiatives in the system of FIG. 1, or other systems for providing strategies to reduce the carbon output and operating costs of a workplace. Table 1810 provides exemplary power usage values for generic computer equipment, such as monitors, desktops and laptops. Table 1810 provides maximum wattage, typically wattage, and idle wattage values. The maximum wattage value may correspond to the maximum wattage the equipment may use, such as during processor intensive activities. The typical wattage may correspond to the typical wattage the equipment may use, such as normal day to day activities. The idle wattage corresponds to the wattage used while the computer is in idle, such as not in active use. The table 1820 may provide the maximum, typical and idle wattage values of ENERGY STAR equipment. The table 1830 may provide the initial generic equipment values used in the system 100 for determining the forecasted energy consumption and electricity costs. The user A 120A may be able to update these values with the actual values for their organization.

FIG. 19 is a set of data tables displaying exemplary values associated with thin client equipment used for forecasting the effects of initiatives in the system of FIG. 1, or other systems for providing strategies to reduce the carbon output and operating costs of a workplace. The table 1910 may provide the maximum, typical and idle wattages for thin client equipment operating in one of three configurations, generic operating system ("OS") isolation, generic process isolation mode and generic hardware isolation. The thin client power draw may include additional server load based on isolation. The table 1920 may provide the power consumption for the server in the various configurations of a thin client implementation. Table 1930 may provide the initial thin client values used in the system 100 for determining the forecasted energy consumption and electricity costs. The user A 120A may be able to update these values with the actual values for their organization.

FIG. 20 is a set of data tables displaying exemplary values associated with telepresence equipment used for forecasting the effects of initiatives in the system of FIG. 1, or other systems for providing strategies to reduce the carbon output and operating costs of a workplace. The table 2010 provides the maximum typically and idle wattages for telepresence equipment. The table 2020 provides exemplary values for the maximum wattage draw for telepresence equipment. The table 2030 provides the initial telepresence values used in the system 100 for determining the forecasted energy consumption and electricity costs. The user A 120A may be able to update these values with the actual values for their organization. The table 2040 provides exemplary initial values for the operating cost of the telepresence equipment. The user A 120A may be able to update these values with the actual values for their organization. The table 2050 provides exemplary initial values for the reductions in air travel achieved by a telepresence implementation. The user A 120A may be able to update these values to the actual values for their organization.

FIG. 21 is a block diagram of an exemplary data schema in the system of FIG. 1, or other systems for providing strategies to reduce the carbon output and operating costs of a workplace.

FIG. 22 illustrates a general computer system 2200, which may represent a service provider server 240, or any of the other computing devices referenced herein. The computer system 2200 may include a set of instructions 2224 that may be executed to cause the computer system 2200 to perform any one or more of the methods or computer based functions disclosed herein. The computer system 2200 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 2200 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 2224 (sequential or otherwise) that specify actions to be taken by that machine. In a particular embodiment, the computer system 2200 may be implemented using electronic devices that provide voice, video or data communication. Further, while a single computer system 2200 may be illustrated, the term "system" shall also be taken to include any collection of systems or subsystems that individually or jointly execute a set, or multiple sets, of instructions to perform one or more computer functions.

As illustrated in FIG. 24, the computer system 2200 may include a processor 2202, such as, a central processing unit (CPU), a graphics processing unit (GPU), or both. The processor 2202 may be a component in a variety of systems. For example, the processor 2202 may be part of a standard personal computer or a workstation. The processor 2202 may be one or more general processors, digital signal processors, application specific integrated circuits, field programmable gate arrays, servers, networks, digital circuits, analog circuits, combinations thereof, or other now known or later developed devices for analyzing and processing data. The processor 2202 may implement a software program, such as code generated manually (i.e., programmed).

The computer system 2200 may include a memory 2204 that can communicate via a bus 2208. The memory 2204 may be a main memory, a static memory, or a dynamic memory. The memory 2204 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 2204 may include a cache or random access memory for the processor 2202. Alternatively or in addition, the memory 2204 may be separate from the processor 2202, such as a cache memory of a processor, the system memory, or other memory. The memory 2204 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 2204 may be operable to store instructions 2224 executable by the processor 2202. The functions, acts or tasks illustrated in the figures or described herein may be performed by the programmed processor 2202 executing the instructions 2224 stored in the memory 2204. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 2200 may further include a display 2214, such as a liquid crystal display (LCD), an organic light emitting diode (OLED), a flat panel display, a solid state display, a cathode ray tube (CRT), a projector, a printer or other now known or later developed display device for outputting determined information. The display 2214 may act as an interface for the user to see the functioning of the processor 2202, or specifically as an interface with the software stored in the memory 2204 or in the drive unit 2206.

Additionally, the computer system 2200 may include an input device 2212 configured to allow a user to interact with any of the components of system 2200. The input device 2212 may be a number pad, a keyboard, or a cursor control device, such as a mouse, or a joystick, touch screen display, remote control or any other device operative to interact with the system 2200.

The computer system 2200 may also include a disk or optical drive unit 2206. The disk drive unit 2206 may include a computer-readable medium 2222 in which one or more sets of instructions 2224, e.g. software, can be embedded. Further, the instructions 2224 may perform one or more of the methods or logic as described herein. The instructions 2224 may reside completely, or at least partially, within the memory 2204 and/or within the processor 2202 during execution by the computer system 2200. The memory 2204 and the processor 2202 also may include computer-readable media as discussed above.

The present disclosure contemplates a computer-readable medium 2222 that includes instructions 2224 or receives and executes instructions 2224 responsive to a propagated signal; so that a device connected to a network 235 may communicate voice, video, audio, images or any other data over the network 235. Further, the instructions 2224 may be transmitted or received over the network 235 via a communication interface 2218. The communication interface 2218 may be a part of the processor 2202 or may be a separate component. The communication interface 2218 may be created in software or may be a physical connection in hardware. The communication interface 2218 may be configured to connect with a network 235, external media, the display 2214, or any other components in system 2200, or combinations thereof. The connection with the network 235 may be a physical connection, such as a wired Ethernet connection or may be established wirelessly as discussed below. Likewise, the additional connections with other components of the system 2200 may be physical connections or may be established wirelessly. In the case of a service provider server 240 or the content provider servers 110A-N, the servers may communicate with users 120A-N through the communication interface 2218.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 2222 may be a single medium, or the computer-readable medium 2222 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 2222 may include a solid-state memory such as a memory card or other package that houses one or more non-volatile read-only memories. The computer-readable medium 2222 also may be a random access memory or other volatile re-writable memory. Additionally, the computer-readable medium 2222 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A method for providing a user interface for determining a strategy for reducing carbon output associated with operation of a workplace, the method comprising:

providing a workplace estimator dashboard to a user through a user interface operatively coupled to a processor configured to analyze a carbon output reduction to an initial workplace configuration in response to user input in the workplace estimator dashboard, the initial workplace configuration comprising an equipment data item and a travel data item, and, the workplace estimator dashboard comprising an initiatives view including a first display area and a second display area, wherein:

the first display area provides to the user a plurality of workplace initiative selection fields in a table to receive indications of one or more selected workplace initiatives from the user to be used in determining a recommended workplace configuration, the plurality of workplace initiative selection fields comprising:

a thin client initiative selection field adjacent to a numerical input field to receive a user inputted thin client initiative refining value, wherein:

the thin client initiative selection field, when selected, causes the processor to:

analyze the initial workplace configuration and the thin client initiative refining value, and determine the recommended workplace configuration to reduce the carbon output of the equipment data item by implementing the selected thin client initiative, and wherein the thin client initiative refining value indicates a portion of the equipment data item to be modified by the selected thin client initiative;

an equipment refresh initiative selection field adjacent to a numerical input field to receive a user inputted equipment refresh initiative refining value, wherein:

the equipment refresh initiative selection field, when selected, causes the processor to:

analyze the initial workplace configuration and an equipment refresh initiative refining value, and determine the recommended workplace configuration to reduce the carbon output of the equipment data item by implementing the selected equipment refresh initiative, and wherein the equipment refresh initiative refining value indicates a portion of the equipment data item to be modified by the selected equipment refresh initiative; and a telepresence initiative selection field that when selected causes the processor to:

analyze the initial workplace configuration, and determine the recommended workplace configuration to reduce the carbon output of the travel data item by implementing the selected telepresence initiative; and the second display area provides to the user an initiatives graph comprising a consumption value display line representing a forecasted consumption value of the initial workplace configuration and a consumption value display line representing a forecasted consumption value of the recommended workplace configuration;

when the user selects the thin client initiative selection field, the equipment refresh initiative selection field, or the telepresence initiative selection field, generating, in the second display area, the consumption value display line representing the forecasted consumption value of the initial workplace configuration;

generating, in the second display area, the consumption value display line representing the forecasted consumption value of the recommended workplace configuration for reducing the carbon output of the initial workplace configuration by implementing each of the one or more selected workplace initiatives; and generating an updated consumption value display line representing an updated forecasted consumption value of the recommended workplace configuration in response to a user inputted change to the thin client initiative selection field, the thin client initiative refining value, the equipment refresh initiative selection field, the equipment refresh initiative refining value, or the telepresence initiative selection field.

2. The method of claim 1 further comprising providing a reduction value to the user via an assessment data display view of the user interface, wherein the reduction value represents a reduction attributable to an operation of a workplace configured with the recommended workplace configuration over a period of time compared with an operation of a workplace configured with the initial workplace configuration and adjusted for headcount growth over the period of time.

3. The method of claim 1 wherein the forecasted consumption value of the recommended workplace configuration comprises at least one of a carbon output value, an electricity cost value, an operating cost value, or a travel cost value.

4. The method of claim 1 further comprising:
receiving a trend value from the user via the interface, the trend value indicating a future value of a variable associated with determining the forecasted consumption value of the recommended workplace configuration; and
processing the initial workplace configuration, the selected workplace initiative, the trend value, and the recommended workplace configuration to determine the forecasted consumption value of the recommended workplace configuration.

5. The method of claim 4 wherein the trend value comprises an electricity cost.

6. The method of claim 1 further comprising providing the user with an environmental comparison value via the user interface, the environmental comparison value indicating a change attributable to an operation of a workplace configured with the recommended workplace configuration over a period of time compared with an operation of a workplace configured with the initial workplace configuration over the period of time.

7. The method of claim 6 wherein the environmental comparison value comprises at least one of a number of cars removed from the road or a number of acres of forest planted.

8. The method of claim 1 wherein the user interface is accessible via a web browser.

9. The method of claim 1 further comprising:
providing, to the user via the first display area of the user interface, an initiative table displaying a list of multiple offices and displaying for each office a corresponding selection field to select a thin client initiative for that office, a corresponding selection field to select an equipment refresh initiative for that office, and a corresponding selection field to select a telepresence initiative for that office.

10. The method of claim 9, further comprising:
generating an office results graph in a third display area of the workplace estimator dashboard, the office results graph corresponding to an office selected from the multiple offices, wherein the office results graph comprises a reduction line representing a difference between the forecasted consumption value of the initial workplace configuration over a predetermined period of time and the forecasted consumption value of the recommended workplace configuration over the predetermined period of time, and the selected office corresponds to the initial workplace configuration; and
updating the reduction line of the office results in response to a user inputted change to the thin client initiative selection field, the thin client initiative refining value, the equipment refresh initiative selection field, the equipment refresh initiative refining value, or the telepresence initiative selection field.

11. The method of claim 1, wherein generating the initiatives graph comprises generating the consumption value display line representing the forecasted consumption value of the initial workplace configuration and the consumption value display line representing the forecasted consumption value of the recommended workplace configuration line on a graph, the graph including a vertical axis and a horizontal axis, the vertical axis representing consumption value unit measurements and the horizontal axis representing a user inputted period of time for which the forecasted consumption value of the initial workplace configuration and the forecasted consumption value of the recommended workplace configuration are determined.

12. The method of claim 11, further comprising:
providing, to the user via the workplace estimator dashboard, an electricity use button corresponding to an electricity use value, a carbon output button corresponding to a carbon output value, an electricity cost button corresponding to an electricity cost value, and an operating cost button corresponding to an operating cost value;
when a user selected consumption value is received via the electricity use button, the carbon output button, the electricity cost button, or the operating cost button, the user selected consumption value comprising the electricity use value, the carbon output value, the electricity cost value, or the operating cost value, updating the consumption value unit measurements of the vertical axis to correlate with the user selected consumption value, and updating the consumption value display line representing the forecasted consumption value of the initial workplace configuration and the consumption value display line representing the forecasted consumption value of the recommended workplace configuration line to represent the user selected consumption value corresponding to the electricity use button, the carbon output button, the electricity cost button, or the operating cost button.

13. The method of claim 11, further comprising:
providing, to the user via a third display area of the workplace estimator dashboard, a client data subsection to allow the user to change client data, the client data subsection comprising a start date input field and an end date input field;
receiving a user inputted start date in the start date input field and a user inputted date in the end date input field; and
updating the horizontal axis of the initiatives graph to represent the user inputted period of time beginning at the user inputted start date and ending at the user inputted end date.

14. The method of claim 1, further comprising:
providing a results view in the workplace estimator dashboard when an open results button in a third display area of the workplace estimator dashboard is activated, the results view comprising:
a workplace configuration comparison selection area providing a results selection field, a projection selection field, and a reduction selection field corresponding to each workplace configuration in a plurality of workplace configurations, wherein:
the results selection field, when selected by the user, causes the processor to generate a workplace comparison graph comprising a results display line representing an electricity use, a carbon output, an electricity cost, or an operating cost of the corresponding office configuration for a predetermined period of time;
the projection selection field, when selected by the user, causes the processor to generate a projection display line in the workplace comparison graph, the projection display line representing a projected electricity use, a projected carbon output, a projected electricity cost, or a projected operating cost of a recommended workplace configuration for the corresponding workplace configuration for the predetermined period of time; and the reduction selection field, when selected in by the user, causes the processor to generate a reduction display line in the workplace comparison graph, the reduction display line representing a reduction in electricity use, a reduction in carbon output, a reduction in electricity cost or a reduction in operating cost of the corresponding workplace configuration based on the recommended workplace configuration for the corresponding workplace configuration for the predetermined period of time.

15. A system for providing a strategy for reducing the carbon output of a workplace, the system comprising:

a memory to store data comprising:

an initial workplace configuration, the initial workplace configuration comprising an equipment data item and a travel data item;

a plurality of workplace initiatives providing a strategy for reducing a carbon output of the workplace, the plurality of workplace initiatives comprising a thin client initiative associated with the equipment data item, an equipment refresh initiative associated with the equipment data item, and a telepresence initiative associated with the travel data item; and one or more selected workplace initiatives, the one or more selected workplace initiatives being selected from the thin client initiative, the equipment refresh initiative, and the telepresence initiative;

a processor operatively connected to the memory and an interface, the processor configured to analyze a carbon output reduction to the initial workplace configuration in response to user input received through a workplace estimator dashboard; and an interface operatively connected to the memory, the interface operative to communicate with a user and comprising the workplace estimator dashboard comprising an initiatives view including a first display area and a second display area, wherein:

the first display area provides to the user a plurality of workplace initiative selection fields in a table to receive indications of one or more selected workplace initiatives from the user to be used in determining a recommended workplace configuration, the plurality of workplace initiative selection fields comprising:

a thin client initiative selection field adjacent to a numerical input field to receive a user inputted thin client initiative refining value, wherein:

the thin client initiative selection field, when selected, causes the processor to:
analyze the initial workplace configuration and the thin client initiative refining value, and
determine the recommended workplace configuration to reduce the carbon output of the equipment data item by implementing the selected thin client initiative, and
wherein the thin client initiative refining value indicates a portion of the equipment data item to be modified by the selected thin client initiative;

an equipment refresh initiative selection field adjacent to a numerical input field to receive a user inputted equipment refresh initiative refining value, wherein:

the equipment refresh initiative selection field, when selected, causes the processor to:
analyze the initial workplace configuration and an equipment refresh initiative refining value, and
determine the recommended workplace configuration to reduce the carbon output of the equipment data item by implementing the selected equipment refresh initiative, and
wherein the equipment refresh initiative refining value indicates a portion of the equipment data item to be modified by the selected equipment refresh initiative;
and a telepresence initiative selection field that when selected causes the processor to:
analyze the initial workplace configuration, and
determine the recommended workplace configuration to reduce the carbon output of the travel data item by implementing the selected the telepresence initiative; and the second display area comprises an initiatives graph comprising a consumption value display line representing a forecasted consumption value of the initial workplace configuration and a consumption value display line representing a forecasted consumption value of the recommended workplace configuration; and wherein, the processor is further operative to:
respond to a user inputted selection of the thin client initiative selection field, the equipment refresh initiative selection field, or the telepresence initiative selection field, by generating, in the second display area, the consumption value display line representing the forecasted consumption value of the initial workplace configuration;
generate, in the second display area, the consumption value display line representing the forecasted consumption value of the recommended workplace configuration for reducing the carbon output of the initial workplace configuration by implementing each of the one or more selected workplace initiatives; and
generate an updated consumption value display line representing an updated forecasted consumption value of the recommended workplace configuration in response to a user inputted change to the thin client initiative selection field, the thin client initiative refining value, the equipment refresh initiative selection field, the equipment refresh initiative refining value, or the telepresence initiative selection field.

16. The system of claim 15 wherein the processor is further operative to:
receive a trend value from the user via the interface, the trend value indicating a future value of a variable associated with determining the forecasted consumption value of the recommended workplace configuration;
process the initial workplace configuration, the selected workplace initiative, the trend value, and the recommended workplace configuration to determine the forecasted consumption value.

17. The system of claim 15, wherein:
the initiatives graph comprises a vertical axis representing consumption value unit measurements and a horizontal axis representing a user inputted period of time for which the forecasted consumption value of the initial workplace configuration and the forecasted consumption value of the recommended workplace configuration are determined.

18. The system of claim 17 wherein the workplace estimator dashboard further comprises a third display area comprising a client data subsection to allow the user to change client data, the client data subsection comprising a start date input field and an end date input field; and wherein the processor is further operative to:
update the horizontal axis of the initiatives graph to represent the user inputted period of time beginning at the user inputted start date and ending at the user inputted end date when a user inputted start date is received in the start date input field and a user inputted date is received in the end date input field.

19. The system of claim 17 wherein the workplace estimator dashboard further comprises an electricity use button corresponding to an electricity use value, a carbon output button corresponding to a carbon output value, an electricity cost button corresponding to an electricity cost value, and an operating cost button corresponding to an operating cost value; and wherein when a user selected consumption value is received via the electricity use button, the carbon output button, the electricity cost button, or the operating cost button, the user selected consumption value comprising the electricity use value, the carbon output value, the electricity cost value, or the operating cost value the processor is further operative to:

update the consumption value unit measurements of the vertical axis to correlate with the user selected consumption value; and update the consumption value display lines to represent the user selected consumption value corresponding to the electricity use button, the carbon output button, the electricity cost button, or the operating cost button.

20. The system of claim 19, wherein the workplace estimator dashboard further comprises a third display area displaying an office results graph, wherein the office results graph comprises a reduction line representing a difference between the forecasted consumption value of the initial workplace configuration over a predetermined period of time and the forecasted consumption value of the recommended workplace configuration over the predetermined period of time, and the office results graph corresponds to an office represented by the initial workplace configuration; and wherein the processor is further operative to update the reduction line of the office graph in response to the updated forecasted consumption values.

21. The system of claim 20, wherein the office results graph further comprises a vertical results axis representing consumption value unit measurements for the user selected consumption value, and a horizontal results axis representing the predetermined period of time.

* * * * *

UNITED STATES PATENT AND TRADEMARK OFFICE
CERTIFICATE OF CORRECTION

PATENT NO.      : 8,812,971 B2
APPLICATION NO. : 12/144910
DATED           : August 19, 2014
INVENTOR(S)     : Benedek et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1100 days.

Signed and Sealed this
Thirteenth Day of October, 2015

Michelle K. Lee
*Director of the United States Patent and Trademark Office*